United States Patent
Crabtree et al.

(10) Patent No.: US 11,595,361 B2
(45) Date of Patent: *Feb. 28, 2023

(54) GEOLOCATION-AWARE, CYBER-ENABLED INVENTORY AND ASSET MANAGEMENT SYSTEM WITH AUTOMATED STATE PREDICTION CAPABILITY

(71) Applicant: QOMPLX, Inc., Tysons, VA (US)

(72) Inventors: Jason Crabtree, Vienna, VA (US); Andrew Sellers, Monument, CO (US)

(73) Assignee: QOMPLX, INC., Reston, VA (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/910,623

(22) Filed: Jun. 24, 2020

(65) Prior Publication Data

US 2021/0014201 A1   Jan. 14, 2021

Related U.S. Application Data

(63) Continuation-in-part of application No. 15/930,063, filed on May 12, 2020, which is a continuation of
(Continued)

(51) Int. Cl.
*H04L 9/40* (2022.01)
*G06F 16/951* (2019.01)
(Continued)

(52) U.S. Cl.
CPC ........ *H04L 63/0428* (2013.01); *G06F 16/951* (2019.01); *G06N 7/005* (2013.01);
(Continued)

(58) Field of Classification Search
CPC ..... H04L 63/0428; H04L 9/14; H04L 9/3236; H04L 9/3297; H04L 63/061;
(Continued)

(56) References Cited

U.S. PATENT DOCUMENTS 6,256,544 B1   7/2001   Weissinger
8,788,254 B2   7/2014   Peloski
(Continued)

FOREIGN PATENT DOCUMENTS

WO   2014159150 A1   10/2014
WO   2017075543 A1   5/2017

*Primary Examiner* — Cheng-Feng Huang
(74) *Attorney, Agent, or Firm* — Galvin Patent Law LLC; Brian R. Galvin; Brian S. Boon

(57) ABSTRACT

A system and method for geolocation-aware, cyber-enabled infrastructure inventory and asset management with state prediction capability. The system tracks tangible and intangible assets, including states associated with each asset such as the location, condition, and value of each asset. Physical assets may be cyber-enabled by attaching wireless computing devices to some or all of the physical assets to provide data about the physical assets using sensors of the computing devices, including but not limited to, such data as location, conditions of storage, and hours of operation or use. Data for each item is stored in a multi-dimensional time series database, which keeps a historical record of the states of each item. Unknown or future states can be predicted by applying predictive models to the time series data. Parametric evaluations of current and predicted future states can be used to optimize the assets against an objective.

14 Claims, 16 Drawing Sheets

Related U.S. Application Data application No. 15/904,006, filed on Feb. 23, 2018, now Pat. No. 10,652,219, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, which is a continuation-in-part of application No. 14/925,974, filed on Oct. 28, 2015, now abandoned.

(51) Int. Cl.

| | | |
|---|---|---|
| *H04L 9/32* | (2006.01) | |
| *G06N 7/00* | (2023.01) | |
| *H04L 9/14* | (2006.01) | |
| *G06N 5/046* | (2023.01) | |
| *G06N 20/00* | (2019.01) | |
| *G06N 5/045* | (2023.01) | |
| *G06N 5/00* | (2023.01) | |
| *H04L 9/00* | (2022.01) | |

(52) U.S. Cl.
CPC ............ *H04L 9/14* (2013.01); *H04L 9/3236* (2013.01); *H04L 9/3297* (2013.01); *H04L 63/061* (2013.01); *H04L 63/1408* (2013.01); *G06N 5/003* (2013.01); *G06N 5/045* (2013.01); *G06N 5/046* (2013.01); *G06N 20/00* (2019.01); *H04L 9/50* (2022.05); *H04L 63/0442* (2013.01); *H04L 63/123* (2013.01)

(58) Field of Classification Search
CPC ............ H04L 63/1408; H04L 63/0442; H04L 63/123; H04L 2209/38; H04L 9/50; H04L 9/0891; H04L 67/52; H04L 9/3239; G06F 16/951; G06N 7/005; G06N 5/003; G06N 5/045; G06N 5/046; G06N 20/00; G06N 5/022

See application file for complete search history.

(56) References Cited

U.S. PATENT DOCUMENTS

| | | | |
|---|---|---|---|
| 8,825,662 B1 * | 9/2014 | Kingman | G06F 16/21 709/224 |
| 9,020,802 B1 | 4/2015 | Florissi et al. | |
| 9,122,694 B1 | 9/2015 | Dukes et al. | |
| 9,299,029 B1 | 3/2016 | Kim | |
| 9,350,550 B2 | 5/2016 | Nix | |
| 9,357,381 B2 | 5/2016 | Cho et al. | |
| 9,426,118 B2 | 8/2016 | Kim | |
| 9,451,462 B2 | 9/2016 | Kim | |
| 9,602,530 B2 | 3/2017 | Ellis et al. | |
| 9,967,334 B2 | 5/2018 | Ford | |
| 10,061,635 B2 | 8/2018 | Ellwein | |
| 10,200,233 B2 | 2/2019 | Anderson et al. | |
| 10,248,910 B2 | 4/2019 | Crabtree et al. | |
| 10,262,321 B1 | 4/2019 | Ramanathan et al. | |
| 10,367,829 B2 | 7/2019 | Huang et al. | |
| 10,839,687 B2 * | 11/2020 | Keller | G07F 17/246 |
| 2012/0026890 A1 * | 2/2012 | Banka | H04L 67/125 370/242 |
| 2012/0197911 A1 * | 8/2012 | Banka | G06F 16/951 707/754 |
| 2013/0104236 A1 * | 4/2013 | Ray | H04L 63/1408 726/25 |
| 2014/0358911 A1 | 12/2014 | Mccarthy et al. | |
| 2015/0371224 A1 | 12/2015 | Lingappa | |
| 2015/0379072 A1 | 12/2015 | Dirac et al. | |
| 2015/0379510 A1 * | 12/2015 | Smith | G06Q 20/3829 705/71 |
| 2016/0188767 A1 * | 6/2016 | Razin | H04L 43/065 703/13 |
| 2016/0203448 A1 | 7/2016 | Metnick et al. | |
| 2016/0275123 A1 | 9/2016 | Lin et al. | |

* cited by examiner

GEOLOCATION-AWARE, CYBER-ENABLED INVENTORY AND ASSET MANAGEMENT SYSTEM WITH AUTOMATED STATE PREDICTION CAPABILITY

CROSS-REFERENCE TO RELATED APPLICATIONS

| Application No. | Date Filed | Title |
|---|---|---|
| Current application | Herewith | A SYSTEM AND METHODS FOR DYNAMIC GEOSPATIALLY-REFERENCED CYBER-PHYSICAL INFRASTRUCTURE INVENTORY AND ASSET MANAGEMENT Is a continuation-in-part of: |
| 15/930,063 | May 12, 2020 | SYSTEM AND METHODS FOR DYNAMIC GEOSPATIALLY-REFERENCED CYBER-PHYSICAL INFRASTRUCTURE INVENTORY AND ASSET MANAGEMENT which is a continuation of: |
| 15/904,006 U.S. Pat. No. 10,652,219 | Feb. 23, 2018 Issue Date May 12, 2020 | A SYSTEM AND METHODS FOR DYNAMIC GEOSPATIALLY-REFERENCED CYBER-PHYSICAL INFRASTRUCTURE INVENTORY AND ASSET MANAGEMENT which is a continuation-in-part of: |
| 15/725,274 U.S. Pat. No.: 10,609,079 | Oct. 4, 2017 Issue Date: Mar. 31, 2020 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT which is a continuation-in-part of: |
| 15/655,113 | Jul. 20, 2017 | ADVANCED CYBERSECURITY THREAT MITIGATION USING BEHAVIORAL AND DEEP ANALYTICS which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH which is a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | A SYSTEM AND METHODS FOR DYNAMIC GEOSPATIALLY-REFERENCED CYBER-PHYSICAL INFRASTRUCTURE INVENTORY AND ASSET MANAGEMENT Is a continuation-in-part of: |
| 15/930,063 | May 12, 2020 | SYSTEM AND METHODS FOR DYNAMIC GEOSPATIALLY-REFERENCED CYBER-PHYSICAL INFRASTRUCTURE INVENTORY AND ASSET MANAGEMENT which is a continuation of: |
| 15/904,006 U.S. Pat. No. 10,652,219 | Feb. 23, 2018 Issue Date May 12, 2020 | A SYSTEM AND METHODS FOR DYNAMIC GEOSPATIALLY-REFERENCED CYBER-PHYSICAL INFRASTRUCTURE INVENTORY AND ASSET MANAGEMENT which is a continuation-in-part of: |
| 15/725,274 U.S. Pat. No. 10,609,079 | Oct. 4, 2017 Issue Date Mar. 31, 2020 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT which is a continuation-in-part of: |
| 15/655,113 | Jul. 20, 2017 | ADVANCED CYBERSECURITY THREAT MITIGATION USING BEHAVIORAL AND DEEP ANALYTICS which is also a continuation-in-part of: |
| 15/237,625 U.S. Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED |

-continued

CROSS-REFERENCE TO RELATED APPLICATIONS

| Application No. | Date Filed | Title |
|---|---|---|
| 15/186,453 | Jun. 18, 2016 | SIMULATION ENGINE which is a continuation-in-part of: SYSTEM FOR AUTOMATED CAPTURE AND ANALYSIS OF BUSINESS INFORMATION FOR RELIABLE BUSINESS VENTURE OUTCOME PREDICTION which is a continuation-in-part of: |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY which is a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION which is a continuation-in-part of: |
| 15/091,563 U.S. Pat. No.: 10,204,147 | Apr. 5, 2016 Issue Date: Feb. 12, 2019 | SYSTEM FOR CAPTURE, ANALYSIS AND STORAGE OF TIME SERIES DATA FROM SENSORS WITH HETEROGENEOUS REPORT INTERVAL PROFILES and is also a continuation-in-part of: |
| 14/986,536 U.S. Pat. No.: 10,210,255 | Dec. 31, 2015 Issue Date: Feb. 19, 2019 | DISTRIBUTED SYSTEM FOR LARGE VOLUME DEEP WEB DATA EXTRACTION and is also a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH | the entire specification of each of which is incorporated herein by reference.

BACKGROUND OF THE INVENTION

Field of the Art

The disclosure relates to the field of asset and inventory management, more specifically to the field of asset and inventory management using telematics and predictive models.

Discussion of the State of the Art

Current inventory and asset management systems are capable of tracking physical assets and inventory, but cannot track the totality of circumstances surrounding any given asset or inventory item. While existing systems can identify a general location of an item (e.g., inside of a warehouse or in shipment), such systems are dependent on scanning or coding at transition points, and have no way to locate a lost or misplaced item other than a physical search. While certain environmental conditions may be generally controlled (e.g., the temperature of a refrigerated shipping container or a wine cellar), the data from such monitoring is not included in the inventory and asset management systems, and the condition of an item cannot be determined other than through physical inspection and manual noting of damage. Such systems also do not track intangible assets, which is treated as an accounting function separate from inventory management. Lastly, such systems track only the current state of the assets and inventory, and have no predictive capabilities.

What is needed is a comprehensive system and method for management of inventory and assets, including automated data collection about the location, value, and condition of tangible assets, the location and value of intangible assets, events affecting both tangible and intangible assets; integration of predictive models to account for unknown states and future states of the inventory and assets; and optimization models of assets and inventory according to the outputs of the predictive model and optimization priorities.

SUMMARY OF THE INVENTION

Accordingly, the inventor has conceived, and reduced to practice, a system and method for geolocation-aware, cyber-enabled infrastructure inventory and asset management with state prediction capability. In a preferred embodiment, the system tracks all tangible and intangible assets of an organization, including states associated with the item such as the location, condition, and value of each item or group of items. Physical assets may be cyber-enabled by attaching wireless computing devices to, or integrating them into, some or all of the physical assets or their containers to provide data about the physical assets using sensors of the computing devices, including but not limited to, such data as location, conditions of storage, and hours of operation or use. Data for each item, whether tangible or intangible, whether tracked by geolocation or not, and whether cyber-enabled or not, is stored in a multi-dimensional time series database, which keeps a historical record of the states of each item. Where information about the state of an item or group of items is unknown for any given period, the state of that item can be predicted by applying predictive models to the time series data. Optimization of the assets is achieved by running parametric evaluations of current and predicted future states of some or all of the assets, and optimizing against priorities established for those assets (e.g., maximization of value in 6 months).

According to a preferred embodiment, a system for inventory and asset management with state prediction capability is disclosed, comprising: a first computing device comprising a first processor and a first memory, and a non-volatile data storage device; a multi-dimensional time series database stored on the non-volatile data storage device; a multi-dimensional time series module comprising a first plurality of programming instructions stored in the first memory and operating on the first processor which cause the first computing device to: receive state information for a plurality of assets over time; and store the state information as time series data in the multi-dimensional time series database; a predictive state model comprising a second plurality of programming instructions stored in the first memory and operating on the first processor which cause the first computing device to: retrieve the time series data; construct a state model for some or all of the plurality of assets from the time series data; predict an unknown or future state for one of the plurality of assets by applying a machine learning algorithm to the time series data for the one or the plurality of assets; and send the state mode and the prediction to a parametric analyzer; a parametric analyzer comprising a third plurality of programming instructions stored in the first memory and operating on the first processor which cause the first computing device to: receive the state model and the prediction; receive a parameter for analysis; iterate the state model over a range of values of the parameter to determine a sensitivity of the state model to changes in value of the parameter; and send the state model and the determined sensitivity to an optimization engine; and an optimization engine comprising a fourth plurality of programming instructions stored in the first memory and operating on the first processor which cause the first computing device to: receive an optimization priority comprising the parameter for analysis; send the parameter for analysis to the parametric analyzer; receive the state model and the determined sensitivity; calculate an optimal state for the state model using the determined sensitivity, the optimal state being a state of the state model that most closely corresponds to the optimization priority.

According to another preferred embodiment, a method for inventory and asset management with state prediction capability is disclosed, comprising the steps of: receiving state information for a plurality of assets over time; storing the state information as time series data in a multi-dimensional time series database; constructing a state model for some or all of the plurality of assets from the time series data; predicting an unknown or future state for one of the plurality of assets by applying a machine learning algorithm to the time series data for the one or the plurality of assets; receiving an optimization priority comprising a parameter for analysis; iterating the state model over a range of values of the parameter to determine a sensitivity of the state model to changes in value of the parameter; calculating an optimal state for the state model using the determined sensitivity, the optimal state being a state of the state model that most closely corresponds to the optimization priority.

According to an aspect of an embodiment, a cyber-physical graph module is used to: retrieve the state model; construct a cyber-physical graph of the state model, the cyber-physical graph comprising vertices representing assets, asset characteristics, and asset states, and edges representing relationships between the vertices; and wherein the optimization engine calculates the optimal state using the determined sensitivity by running one or more graph traversal algorithms to determine an optimal path within the cyber-physical graph.

According to an aspect of an embodiment, a plurality of second computing devices attached to one of a plurality of physical assets, is used to: periodically determine a state of the physical asset to which it is attached, the state comprising data from the sensor; periodically generate a status update message, the status update message comprising the device identifier of the second computing device and the determined state; and send the status update message via the wireless communication device to the first computing device; wherein the device identifier and determined state for each status update message are saved as time series state information in the multi-dimensional time series database.

According to an aspect of an embodiment, the sensor is a geolocation sensor.

According to an aspect of an embodiment, the sensor is a temperature sensor.

According to an aspect of an embodiment, the state information for one or more assets further comprises a condition for execution of a smart contract.

According to an aspect of an embodiment, a smart contract execution module is used to: generate a smart contract for one of the plurality of assets; receive a parameter for execution of the smart contract, the parameter specifying a condition for execution of the contract; monitor the state information for the asset for the parameter; and execute the smart contract when the parameter is detected in the state information.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
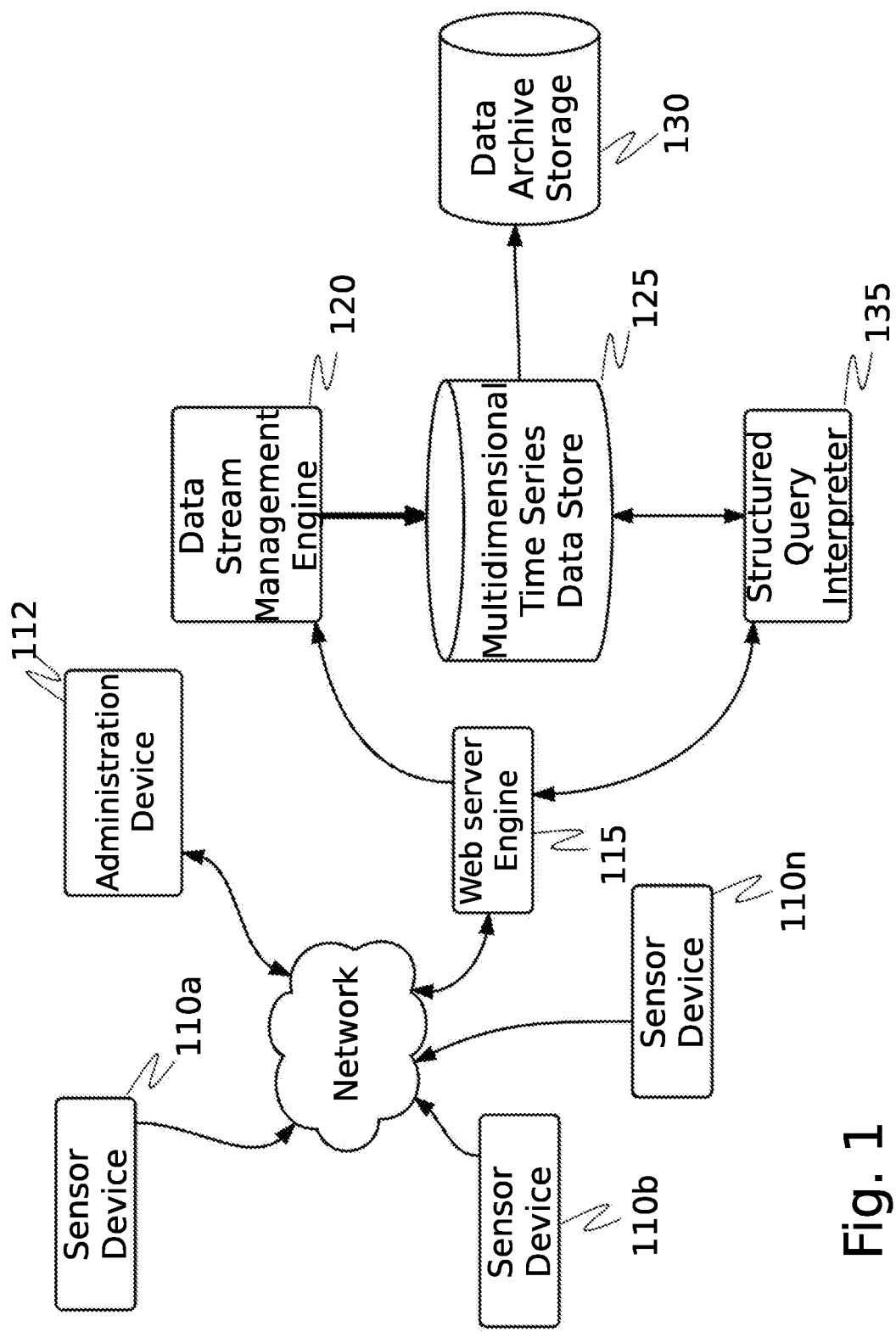
FIG. 1 is a diagram of an exemplary architecture of a system for the capture and storage of time series data from sensors with heterogeneous reporting profiles according to a preferred aspect of the invention.

The inventor has conceived, and reduced to practice, a system and method for geolocation-aware, cyber-enabled infrastructure inventory and asset management with state prediction capability. In a preferred embodiment, the system tracks all tangible and intangible assets of an organization, including states associated with the item such as the location, condition, and value of each item or group of items. Physical assets may be cyber-enabled by attaching wireless computing devices to, or integrating them into, some or all of the physical assets or their containers to provide data about the physical assets using sensors of the computing devices, including but not limited to, such data as location, conditions of storage, and hours of operation or use. Data for each item, whether tangible or intangible, and whether cyber-enabled or not, is stored in a multi-dimensional time series database, which keeps a historical record of the states of each item. Where information about the state of an item or group of items is unknown for any given period, the state of that item can be predicted by applying predictive models to the time series data. Optimization of the assets is achieved by running parametric evaluations of current and predicted future states of some or all of the assets, and optimizing against priorities established for those assets (e.g., maximization of value in 6 months).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1 is a diagram of an exemplary architecture of a system for the capture and storage of time series data from sensors with heterogeneous reporting profiles according to a preferred aspect of the invention. In this embodiment, a plurality of sensor devices 110a-n stream data to a collection device, in this case a web server acting as a network gateway 115. These sensors 110a-n can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 120, where it is aggregated and organized for storage in a specific type of data store 125 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store as attempting to assign identifying keys and to store real time data from multiple sensors would invariably lead to significant data loss. In this circumstance, the data stream management engine 120 would hold incoming data in memory, keeping only the parameters, or "dimensions" from within the larger sensor stream that are pre-decided by the administrator of the study as important and instructions to store them transmitted from the administration device 112. The data stream management engine 120 would then aggregate the data from multiple individual sensors and apportion that data at a predetermined interval, for example, every 10 seconds, using the timestamp as the key when storing the data to a multidimensional time series data store over a single swimlane of sufficient size. This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use strictly single time interval over a single swimlane mode of data storage. In addition to the single time interval method the invention also can make use of event based storage triggers where a predetermined number of data receipt events, as set at the administration device 112, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 112.

It is also likely that that during times of heavy reporting from a moderate to large array of sensors, the instantaneous load of data to be committed will exceed what can be reliably transferred over a single swimlane. The embodiment of the invention can, if capture parameters pre-set at the administration device 112, combine the data movement capacity of two or more swimlanes, the combined bandwidth dubbed a metaswimlane, transparently to the committing process, to accommodate the influx of data in need of commitment. All sensor data, regardless of delivery circumstances are stored in a multidimensional time series data store 125 which is designed for very low overhead and rapid data storage and minimal maintenance needs to sap resources. The embodiment uses a key-value pair data store examples of which are Riak, Redis and Berkeley DB for their low overhead and speed, although the invention is not specifically tied to a single data store type to the exclusion of others known in the art should another data store with better response and feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example, one group of developers restrict the size of their multidimensional time series key-value pair data store to approximately $8.64 \times 10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 130. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 112 and acted upon within the database by the structured query interpreter 135. Below is a highly simplified example statement to illustrate the method by which a very small number of options that are available using the structured query interpreter 135 might be accessed.

SELECT [STREAMING|EVENTS] data_spec FROM [unit] timestamp TO timestamp GROUPBY (sensor_id, identifier) FILTER [filter_identifier] FORMAT [sensor [AS identifier] [, sensor [AS identifier]] . . . ] (TEXT|JSON-|FUNNEL|KML|GEOJSON|TOPOJSON);

Here "data_spec" might be replaced by a list of individual sensors from a larger array of sensors and each sensor in the list might be given a human readable identifier in the format "sensor AS identifier". "unit" allows the researcher to assign a periodicity for the sensor data such as second (s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others known to the art, depending on the intended use of the data.

Figure 2:
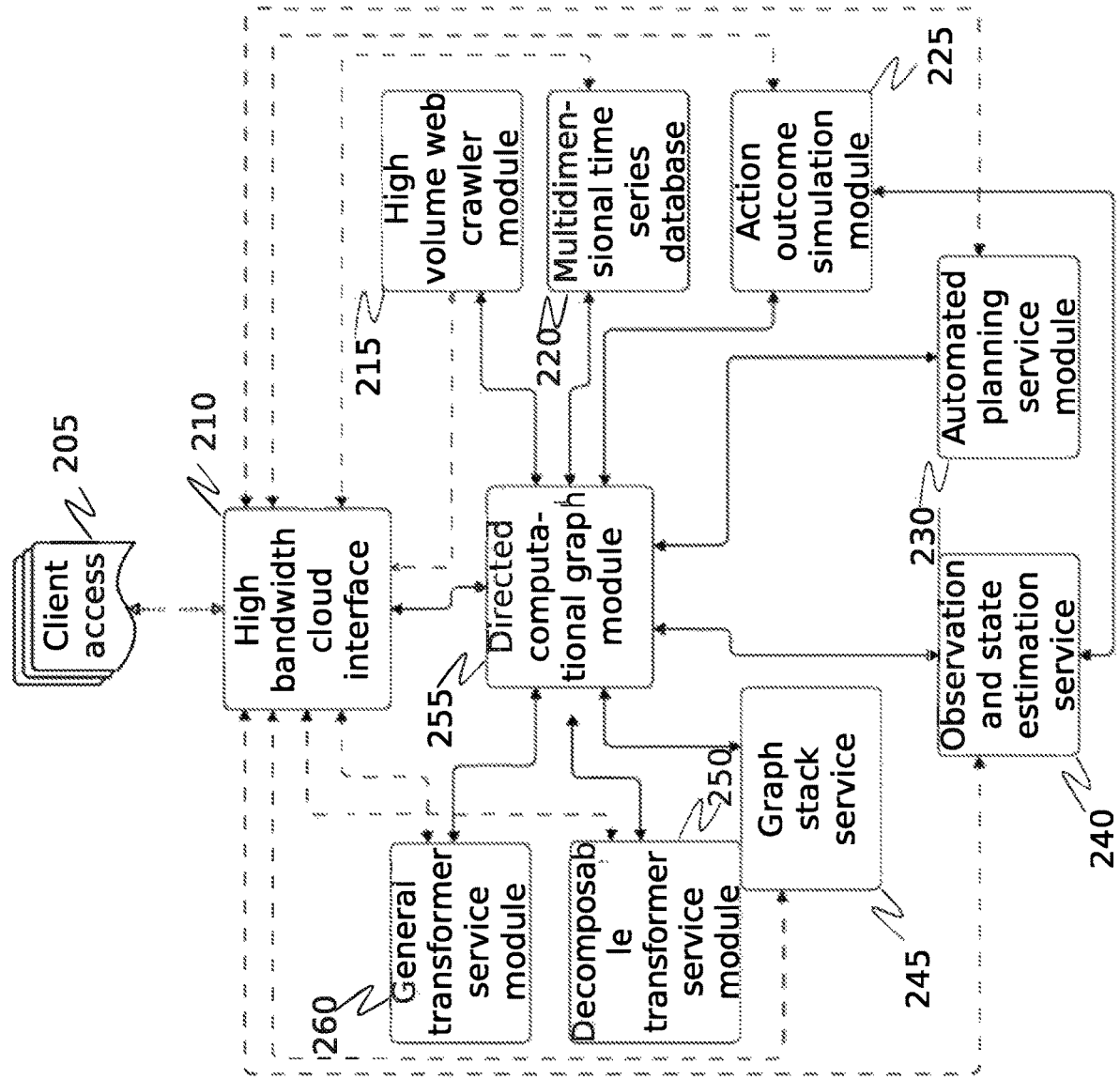
FIG. 2 is a diagram of an exemplary architecture of a business operating system according to a preferred aspect of the invention.

FIG. 2 is a diagram of an exemplary architecture of a business operating system 200 according to a preferred aspect. Client access to the system 205 both for system control and for interaction with system output such as automated predictive decision making and planning and alternate pathway simulations, occurs through the system's highly distributed, very high bandwidth cloud interface 210 which is application driven through the use of the Scala/Lift development environment and web interaction operation mediated by AWS ELASTIC BEANSTALK™, both used for standards compliance and ease of development. Much of the business data analyzed by the system both from sources within the confines of the client business, and from cloud-based sources, also enter the system through the cloud interface 210, data being passed to the analysis and transformation components of the system, the directed computational graph module 255, high volume web crawling module 215 and multidimensional time series database 220. The directed computational graph retrieves one or more streams of data from a plurality of sources, which includes, but is in no way not limited to, a number of physical sensors, web-based questionnaires and surveys, monitoring of electronic infrastructure, crowd sourcing campaigns, and human input device information. Within the directed computational graph, data may be split into two identical streams, wherein one sub-stream may be sent for batch processing and storage while the other sub-stream may be reformatted for transformation pipeline analysis. The data is then transferred to general transformer service 260 for linear data transformation as part of analysis or decomposable transformer service 250 for branching or iterative transformations that are part of analysis. The directed computational graph 255 represents all data as directed graphs where the transformations are nodes and the result messages between transformations edges of the graph. These graphs which contain considerable intermediate transformation data are stored and further analyzed within graph stack module 245. High volume web crawling module 215 uses multiple server hosted preprogrammed web spiders to find and retrieve data of interest from web-based sources that are not well tagged by conventional web crawling technology. Multiple dimension time series database module 220 receives data from a large plurality of sensors that may be of several different types. The module is designed to accommodate irregular and high volume surges by dynamically allotting network bandwidth and server processing channels to process the incoming data. Data retrieved by the multidimensional time series database 220 and the high volume web crawling module 215 may be further analyzed and transformed into task optimized results by the directed computational graph 255 and associated general transformer service 250 and decomposable transformer service 260 modules.

Results of the transformative analysis process may then be combined with further client directives, additional business rules and practices relevant to the analysis and situational information external to the already available data in the automated planning service module 230 which also runs powerful predictive statistics functions and machine learning algorithms to allow future trends and outcomes to be rapidly forecast based upon the current system derived results and choosing each a plurality of possible business decisions. Using all available data, the automated planning service module 230 may propose business decisions most likely to result is the most favorable business outcome with a usably high level of certainty. Closely related to the automated planning service module in the use of system derived results in conjunction with possible externally supplied additional information in the assistance of end user business decision making, the business outcome simulation module 225 coupled with the end user facing observation and state estimation service 240 allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away or could rent satellite time to look but both of those are expensive for a probable sensor issue, significantly less than cleaning up an oil spill though and then with significant negative public exposure. These sensor issues have happened before and the business operating system 200 has data from them, which no one really studied due to the great volume of columnar figures, so the alternative courses 225, 240 of action are run. The system, based on all available data predicts that the fouled sensor or pump are unlikely the root cause this time due to other available data and the contractor is dispatched. She finds a small breach in the pipeline. There will be a small cleanup and the pipeline needs to be shut down for repair but multiple tens of millions of dollars have been saved. This is just one example of a great many of the possible use of the business operating system, those knowledgeable in the art will easily formulate more.

Figure 3:
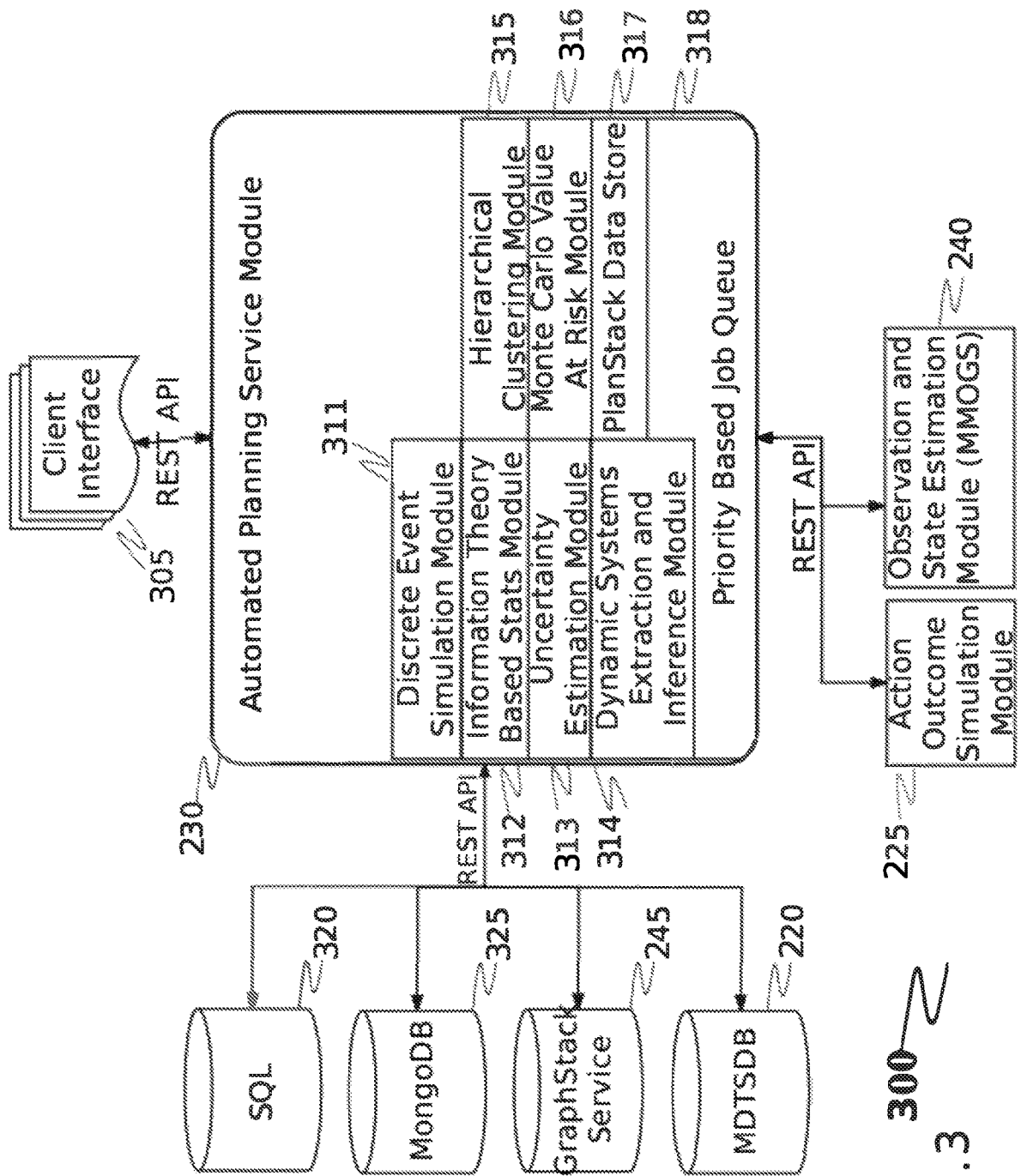
FIG. 3 is a diagram of an exemplary architecture of an automated planning service cluster and related modules according to a preferred aspect.

FIG. 3 is a diagram of an exemplary architecture of an automated planning service module and related modules 300 according to an embodiment of the invention. Seen here is a more detailed view of the automated planning service module 230 as depicted in FIG. 2. The module functions by receiving business decision or business venture candidates as well as relevant currently available related data and any campaign analysis modification commands through a client interface 305. The module may also be used provide transformed data or run parameters to the action outcome simulation module 225 to seed a simulation prior to run or to transform intermediate result data isolated from one or more actors operating in the action outcome simulation module 225, during a simulation run. Significant amounts of supporting information such as, but not restricted to current business conditions, infrastructure, ongoing venture status, financial status, market conditions, and world events which may impact the current decision or venture that have been collected by the business operating system as a whole and stored in such data stores as the multidimensional times series database 220, the analysis capabilities of the directed computational graph module 255 and web-based data retrieval abilities of the high volume web crawler module 215 all of which may be stored in one or more data stores 320, 325 may also be used during simulation of alternative business decision progression, which may entail such variables as, but are not limited to implementation timing, method to end changes, order and timing of constituent part completion or impact of choosing another goal instead of an action currently under analysis.

Contemplated actions may be broken up into a plurality of constituent events that either act towards the fulfillment of the venture under analysis or represent the absence of each event by the discrete event simulation module 311 which then makes each of those events available for information theory based statistical analysis 312, which allows the current decision events to be analyzed in light of similar events under conditions of varying dis-similarity using machine learned criteria obtained from that previous data; results of this analysis in addition to other factors may be analyzed by an uncertainty estimation module 313 to further tune the level of confidence to be included with the finished analysis. Confidence level would be a weighted calculation of the random variable distribution given to each event analyzed. Prediction of the effects of at least a portion of the events involved with a business venture under analysis within a system as complex as anything from the microenvironment in which the client business operates to more expansive arenas as the regional economy or further, from the perspective of success of the client business is calculated in dynamic systems extraction and inference module 314, which use, among other tools algorithms based upon Shannon entropy, Hartley entropy and mutual information dependence theory.

Of great importance in any business decision or new business venture is the amount of business value that is being placed at risk by choosing one decision over another. Often this value is monetary but it can also be competitive placement, operational efficiency or customer relationship based, for example: the may be the effects of keeping an older, possibly somewhat malfunctioning customer relationship management system one more quarter instead of replacing it for $14 million dollars and a subscription fee. The automated planning service module has the ability predict the outcome of such decisions per value that will be placed at risk using programming based upon the Monte Carlo heuristic model 316 which allows a single "state" estimation of value at risk. It is very difficult to anticipate the amount of computing power that will be needed to complete one or more of these business decision analyses which can vary greatly in individual needs and often are run with several alternatives concurrently. The invention is therefore designed to run on expandable clusters 315, in a distributed, modular, and extensible approach, such as, but not exclusively, offerings of Amazon's AWS. Similarly, these analysis jobs may run for many hours to completion and many clients may be anticipating long waits for simple "what if" options which will not affect their business operations in the near term while other clients may have come upon a pressing decision situation where they need alternatives as soon as possible. This is accommodated by the presence of a job queue that allows analysis jobs to be implemented at one of multiple priority levels from low to urgent. In case of a change in more hypothetical analysis jobs to more pressing, job priorities can also be changed during run without loss of progress using the priority based job queue 318.

Structured plan analysis result data may be stored in either a general purpose automated planning engine executing Action Notation Modeling Language (ANML) scripts for modeling which can be used to prioritize both human and machine-oriented tasks to maximize reward functions over finite time horizons 317 or through the graph-based data store 245, depending on the specifics of the analysis in complexity and time run.

The results of analyses may be sent to one of two client facing presentation modules, the action outcome simulation module 225 or the more visual simulation capable observation and state estimation module 240 depending on the needs and intended usage of the data by the client.

Figure 4:
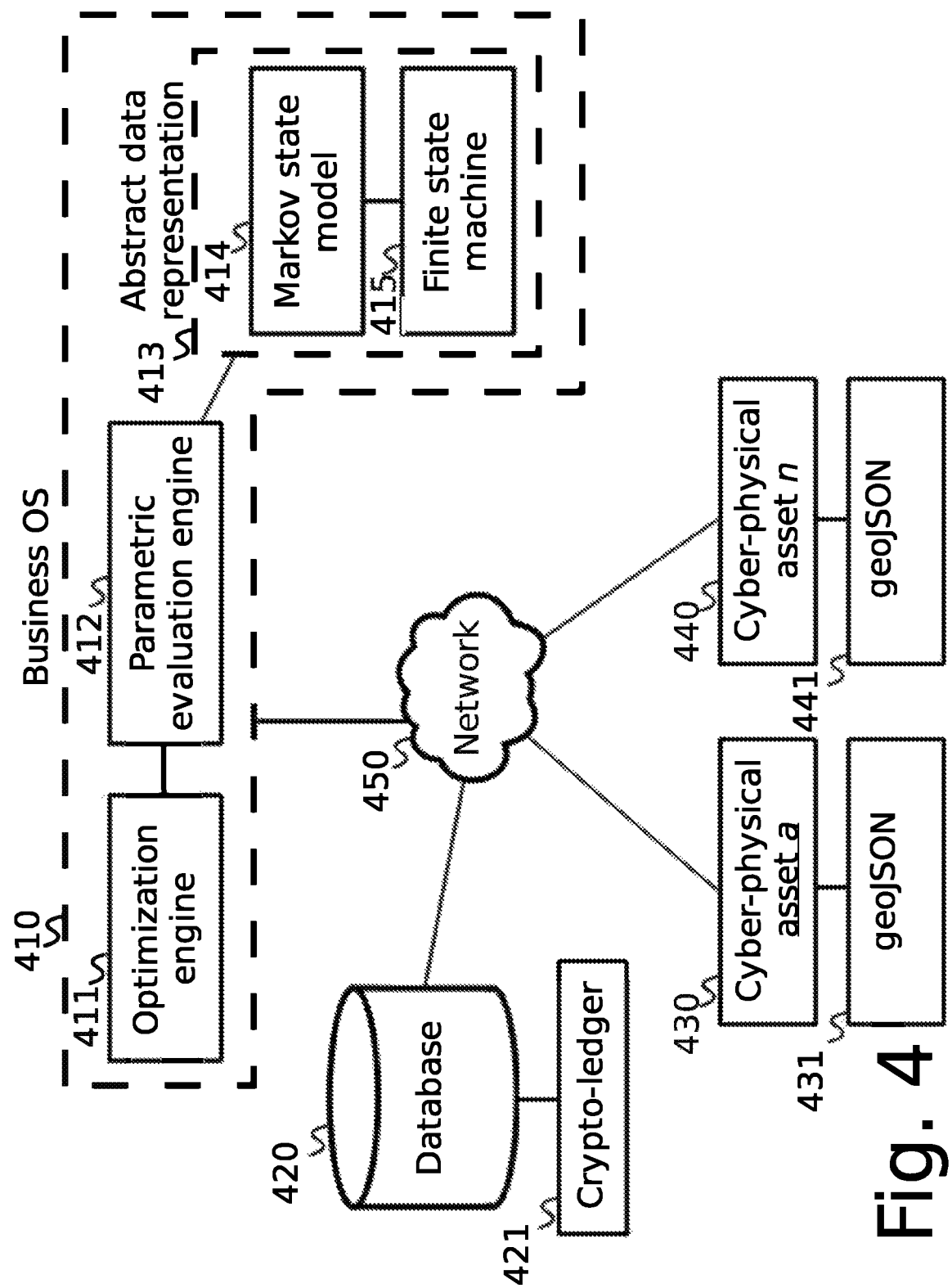
FIG. 4 is a system diagram illustrating connections between core components of the invention for geo-locating and tracking the status of cyber-physical assets, according to a preferred aspect.

FIG. 4 is a system diagram illustrating connections between core components of the invention for geo-locating and tracking the status of cyber-physical assets, according to a preferred aspect. A business operating system 410 operates an optimization engine 411, parametric evaluation engine 412, and uses abstract data representations 413 including Markov State Models (MSM) 414 and abstract representations of finite state machines 415 to read, modify, and generally operate on data. A business operating system 410 such as this is connected to a network 450, which may be an intranet, the internet, a local area connection, or any one of many other configurations of networks. Also connected to this network 450 is at least one database 420, which holds information including a crypto-ledger 421, an implementation of a blockchain data construct, which will be expounded upon in later figures. Connected to a network 450 is at least one cyber-physical asset 430, 440, which may hold any number of sensors or data according to a specific implementation, and have geoJSON 431, 441 data with which to record their geo-physical location. A cyber-physical asset 430, 440 may be a delivery crate with a possible plurality of sensors and computers embedded or attached to the crate in some way, or may be an object inside a mundane crate such as a piece of research equipment which may communicate with a business operating system 410 during transit, or may be a stationary object such as research equipment, computer systems, and more, which are capable of sending status updates at least consisting of geoJSON 431, 441 information regarding their geophysical location over a network 450. A business operating system may use a Markov State Model (MSM) 414 as a tool for data representation of the states of cyber-physical assets which send status updates in this way, and may or may not reduce a MSM to a finite state machine representation 415 with or without stochastic elements, according to a preferred aspect. These data representations 413 are useful for visualizing and analyzing current, previous, and possible future states of assets 430, 440 connected to an operating system 410 over a network 450.

Figure 5:
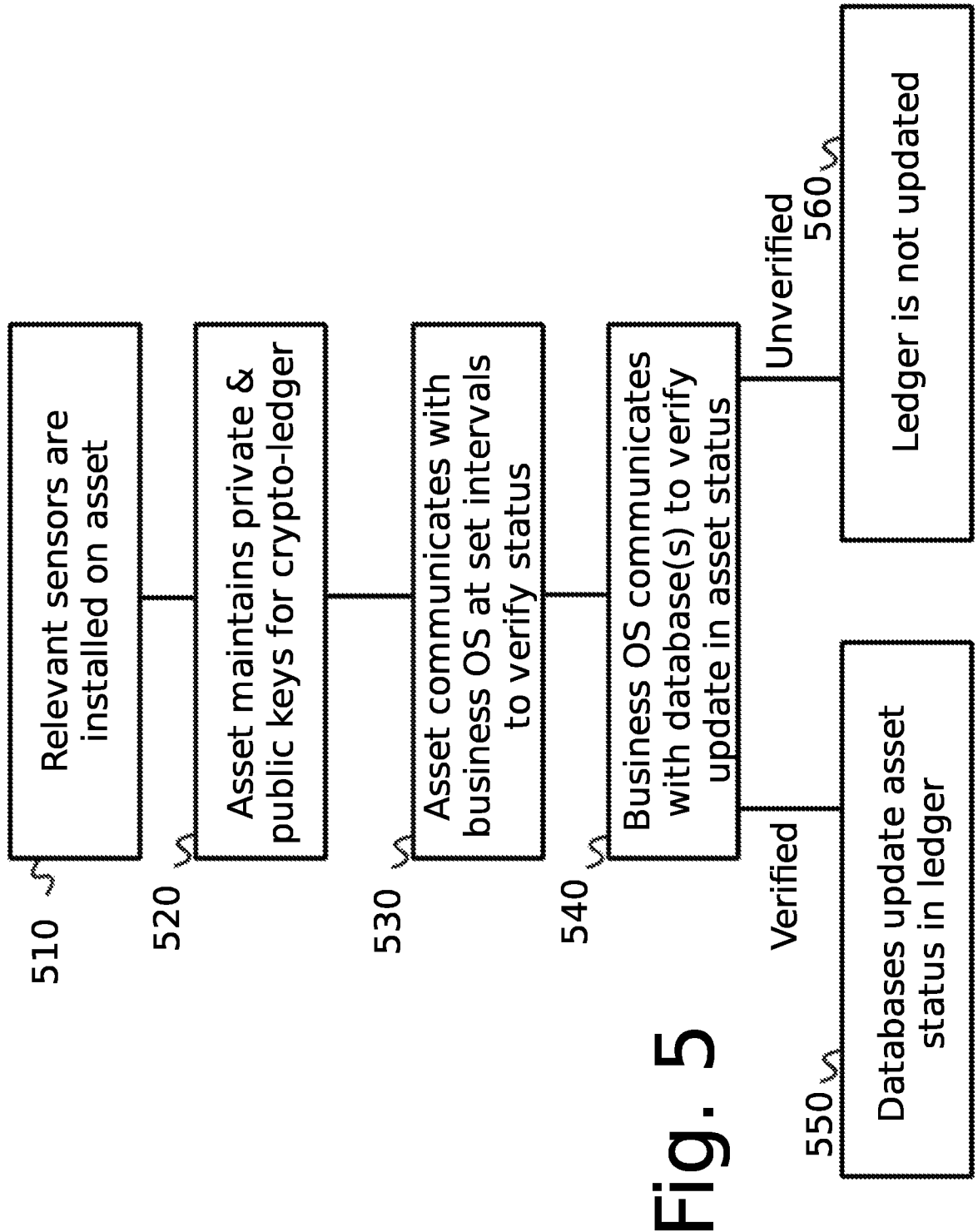
FIG. 5 is a method diagram illustrating key steps in the communication between cyber-physical assets and remote servers, according to a preferred aspect.

FIG. 5 is a method diagram illustrating key steps in the communication between cyber-physical assets 430, 440 and remote servers running a business operating system 410, according to a preferred aspect. Any relevant sensors or sensing equipment and software must be installed on the asset 510 first, before relevant data can be sent to a business operating system 410. Such sensors may include a variety of implementations, including temperature sensors, GPS tracking software, accelerometers, or any other sensors and accompanying hardware and software as needed or desired by the user upon implementation of this system. The cyber-physical asset 430, 440 will maintain, as part of their software involvement in the system, a private key, and the requisite software for a crypto-ledger 421 implementation 520 using blockchain technology. Blockchain technology is essentially a method for secure message sending between network connected devices, often used for the purposes of transaction ledgers and smart contracts, using asymmetric encryption. The cyber-physical asset will be in communication with a business operating system 410 either continuously or at set intervals 530, depending on individual implementations, according to a preferred aspect. During these communications, the asset will, using the asymmetric encryption in blockchain crypto-ledgers, send status updates based on any sensors installed on the asset 530. A business operating system that receives these updates will then verify them with previous status updates in databases 540 to ensure that the updates received are legitimate, and not forged or from a dubious source. If the public key, or signature, or contents of the encrypted message are not able to be verified properly, the ledger held in at least one database is not updated 560. If they are properly verified and indicate they are from the real asset and indicate a legitimate status update, any databases which hold a copy of the crypto-ledger 421 are updated with the new status of the asset 550. It will be apparent to one skilled in the art that additional uses for an update verification process may be that partial updates (for example, with certain pieces of data not sent to the server in the status update) may be used, and with this partial observability, missing data between status updates may be inferred using machine learning techniques. It is possible to implement a rules engine for this purpose, to determine what rules to apply for inference of missing data, depending on the implementation of the system.

Figure 6:
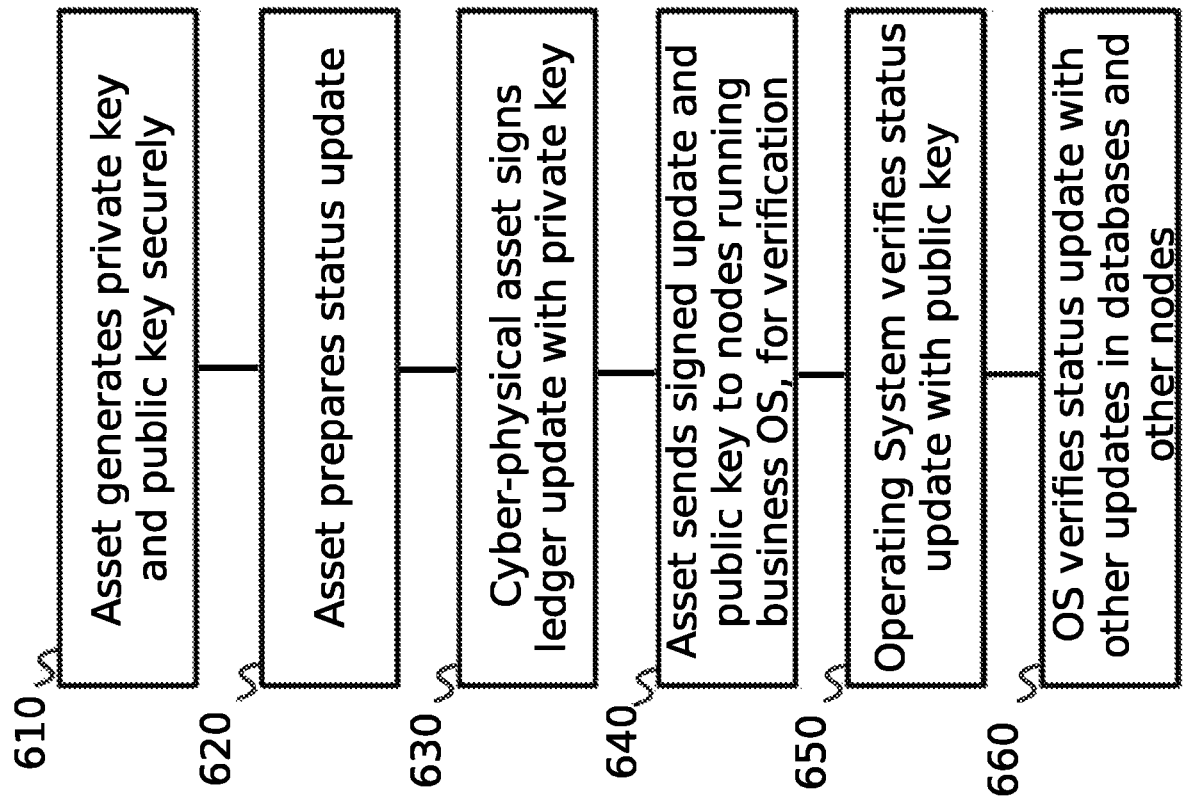
FIG. 6 is a method diagram illustrating key steps in a business operating system interacting with data received from cyber-physical assets in databases to verify updates in a cryptographic ledger, according to a preferred aspect.

FIG. 6 is a method diagram illustrating key steps in a business operating system 410 interacting with data received from cyber-physical assets 430, 440 in databases 420 to verify updates in a cryptographic ledger 421, according to a preferred aspect. Any asset must generate a public and private key 610 in accordance with the specifications of asymmetric encryption, which are known technologies in the art. An asset must prepare an update 620, which may mean formatting data received from any installed sensors, performing any relevant calculations or modifications to raw data, and preparing any network devices for sending the data across a network 450. The cyber-physical asset 430, 440 must sign any update with its private key 630, which encrypts the update in a way that only the private or public keys can be used to decrypt. The asset, when connected to a network 450, may send the prepared and encrypted update to any "nodes" or computer systems running a business operating system 410, to be verified before being added onto the ledger 421, 640. Any nodes running a business operating system 410 will attempt to verify the asset status update 650, before then verifying with the ledger held in at least one database 420 and any other relevant nodes or computer systems with such a business operating system 410 that the asset update is legitimate, valid, and shall be added to the ledger of status updates from the asset 660. It is possible to implement this system and method in an ongoing identification and authentication service, for continuous updates, rather than discrete authentication and verification for discrete updates.

Figure 7:
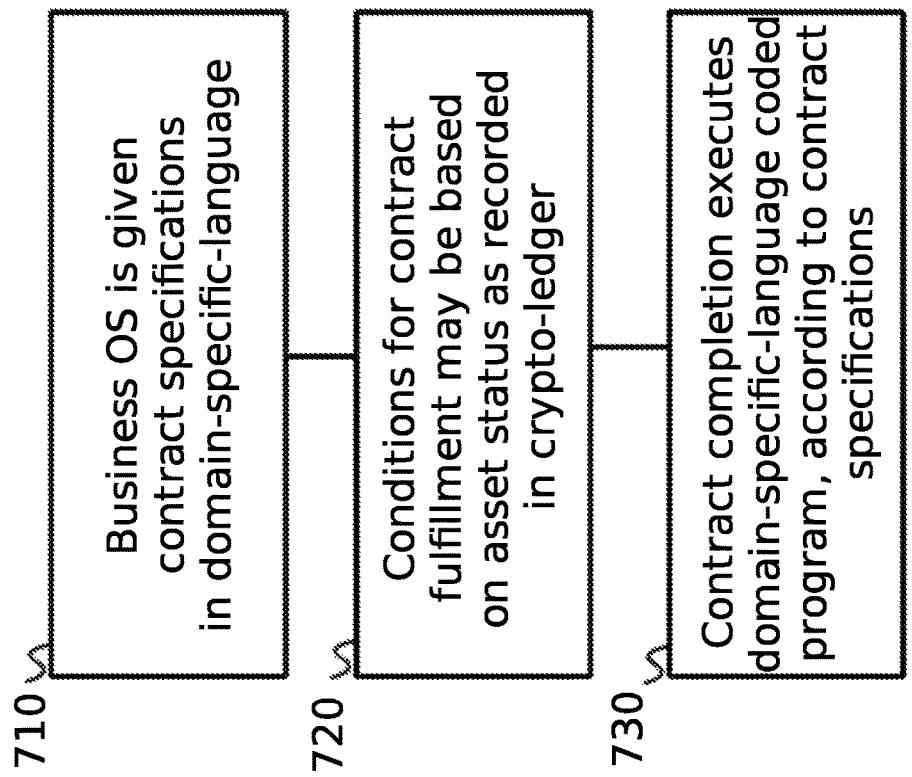
FIG. 7 is a method diagram illustrating several steps in the use of smart contracts combined with cyber-physical assets, according to a preferred aspect.

FIG. 7 is a method diagram illustrating several steps in the use of smart contracts combined with cyber-physical assets, according to a preferred aspect. Such smart contracts are possible as a result of implementing blockchain technology to not only keep track of and verify entries in crypto-ledgers 421, but to store and execute distributed programs, for the purposes of self-enforcing contracts, known as smart contracts. In this implementation, a smart contract is implemented with a domain-specific-language (DSL) which may be provided by a vendor of the system or specified by a user of the system 710. A DSL may be thought of as a custom programming language, and may, depending on the implementation, also be an otherwise unmodified implementation of a programming language, according to a preferred aspect. Conditions for smart contracts in this system may be based on the past, present, or future status of cyber-physical assets monitored by the system 720. Upon completion of whatever conditions are programmed into a smart contract, the contract program executes, which may perform any number of tasks that may be programmed into a computer, including withdrawal of funds, depositing of funds, messages sent across a network 450, or other similar results of an executed program 730, according to a preferred aspect. These parametrically-triggered remuneration contracts may be versatile and diverse in their implementation according to the needs of the consumer.

Figure 8:
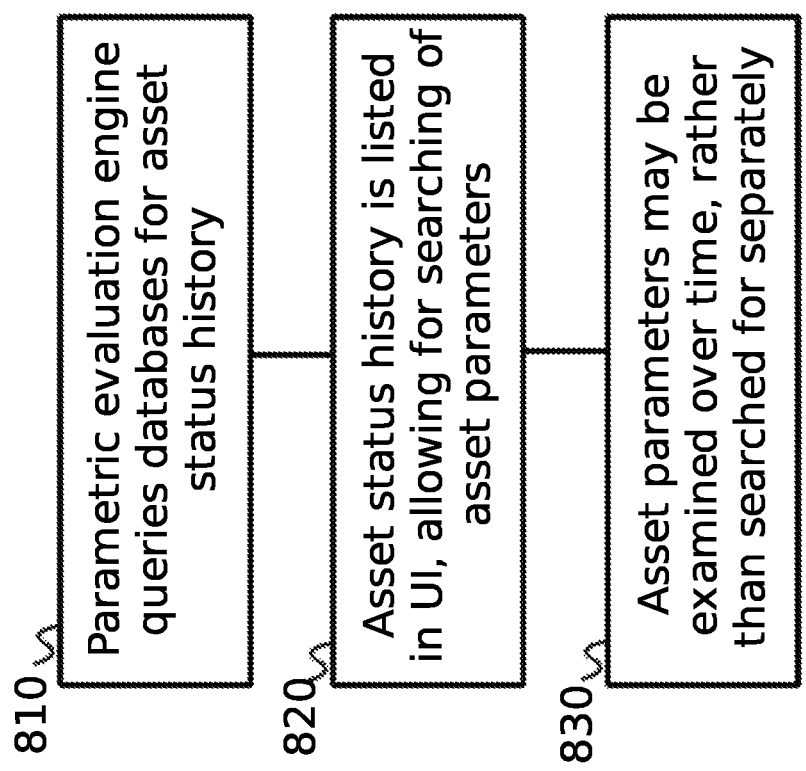
FIG. 8 is a method diagram illustrating key steps in the function of a parametric evaluation engine, according to a preferred aspect.

FIG. 8 is a method diagram illustrating key steps in the function of a parametric evaluation engine 412, according to a preferred aspect. A parametric evaluation engine 412 may query at least one database 420 for a ledger 421 containing previous or current status updates of at least one cyber-physical asset 430, 440, 810. This query may be performed across a network 450 from a business operating system 410 run on a computer system and may take the form of any database query format, including NOSQL™ databases such as MONGODB™, or SQL™ databases including MICROSOFT SQL SERVER™ and MYSQL™ databases, depending on the desired database implementation in the system, according to a preferred aspect. Asset status histories may be returned to a parametric evaluation engine 412, which may be listed to a user of the engine, in a basic user interface which allows the listing and searching of such asset status update histories 820. Asset statuses may be viewed over time as a history rather than listed separately, if desired, for the purpose of noting and examining trends in an asset's status 830, according to an aspect.

Figure 9:
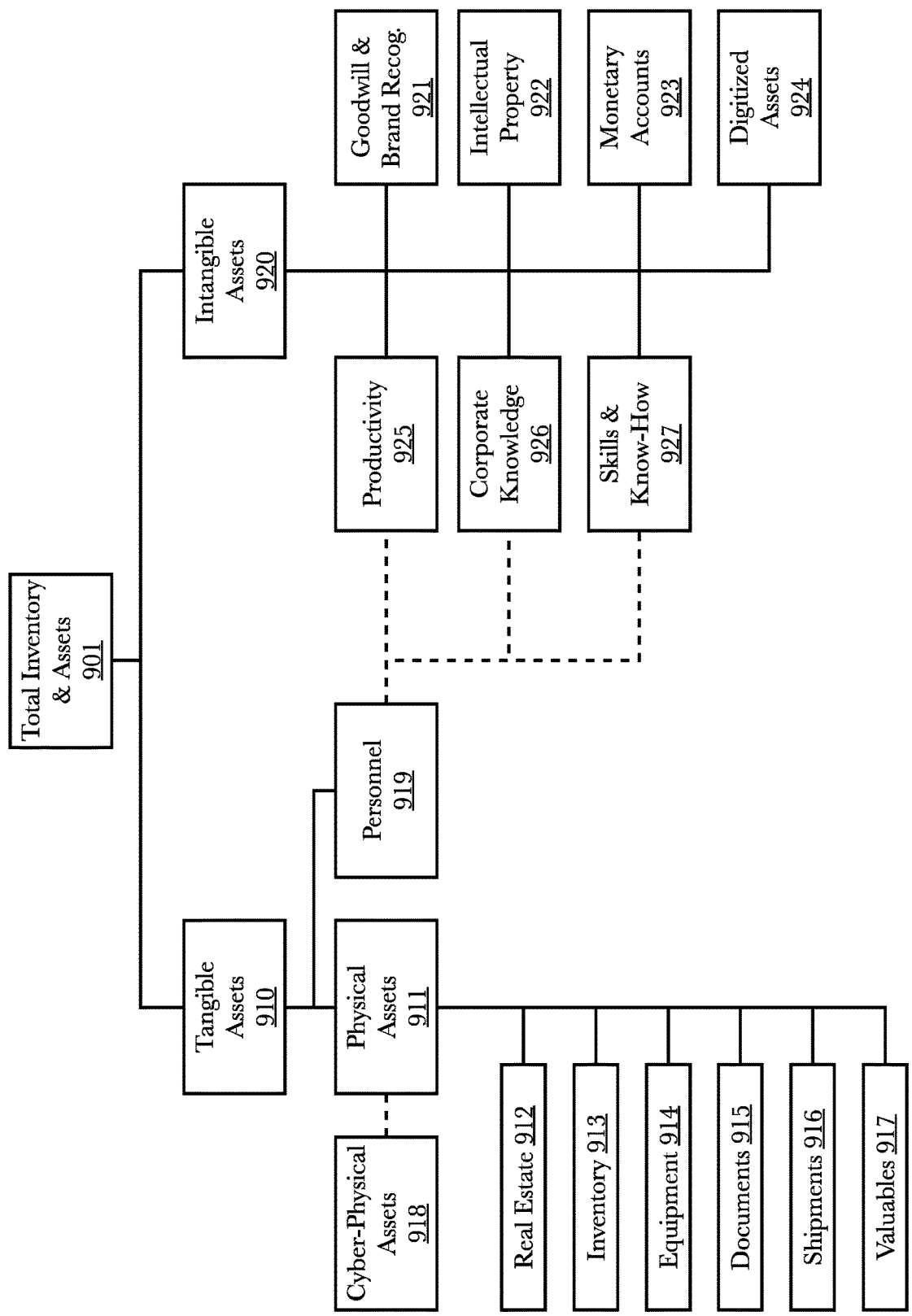
FIG. 9 is a relational diagram showing exemplary types of assets that may be managed using a system for cyber-enabled infrastructure inventory and asset management with state prediction capability.

FIG. 9 is a relational diagram showing exemplary types of assets that may be managed using a system for cyber-enabled infrastructure inventory and asset management with state prediction capability. The total inventory and assets (inventory being a subset of assets) of an organization 901 is made up of tangible 910 and intangible assets 920.

The tangible assets 910 of an organization include physical assets 911, such as real estate 912, inventory 913, equipment and tools 914, contracts, leases, and other documents 915, goods under shipment and in transit 916, and valuables 917 like cash, valuable metals, jewels, or works of art. Any tangible asset can be converted to a cyber-physical asset 918 by attaching to it or its container a computing device capable of continuously or periodically sensing some aspect or state of the tangible asset and relaying it to the asset and inventory management system. In most cases, the computing device would transmit the information wirelessly, but wired transmission can also be used, particularly where the asset is large and unlikely to change locations. The computing device can be a simple device such as a geolocation-enabled chip that uses global positioning system (GPS) data, or can be a more complex device with multiple sensors to determine different states of the assets such as GPS for geolocation, temperature sensors to calculate possible degradation and spoilage, accelerometers to determine orientation, vibration, shaking, dropping, etc., gyroscopes to determine orientation, moisture sensors to determine leakage or dampness, etc. Tangible assets 910 technically include personnel 919 of the organization, although most of the value of personnel comes from intangible benefits that they provide such as productivity 925, corporate knowledge 926, and skills and know-how 927.

The intangible assets 920 of an organization are non-physical assets that nevertheless are valuable to the organization. While intangible assets are non-physical, they can nevertheless have locations associated with them as states of the asset.

For example, monetary accounts 932 (including bank accounts, brokerage accounts, etc.) can be held in different countries, each of which has different financial regulations and risks, and the location, regulations, risks, and other differentiating factors can be tracked as states of the monetary accounts. Additionally, the different types of assets (e.g., cash, stocks, bonds, etc.) held in each account can have differing characteristics, each of which can also be modeled as states of a particular asset or sub-asset in a given account. Further, the size and reliability of the banks or other institutions as which monetary accounts are held can be tracked as states of the monetary accounts or their assets. Other risks associated with monetary accounts 923 and digitized assets 924 can be tracked such as the risk of monies or value held as cryptocurrencies which may or may not be liquid or exchangeable at the time they are needed, or the fact that such assets can be subject to loss in the case of cybersecurity attacks or if adequate backups are not made.

Digitized assets 924 include such things as electronically stored or created documents; film, photos, and other works of art; engineering designs; reports; other intellectual products; or scanned version of any of the above, especially where the original, physical version is destroyed. Digitized assets 924 can be subject to loss in the case of cybersecurity attacks or if adequate backups are not made. While digitized assets 924 are intangible, and multiple copies can normally be made, the physical location of each copy can be an important characteristic or state. For example, a server located in an area prone to natural disasters or in a foreign jurisdiction may have risks associated with it that a server in a different location may not, and a copies in multiple locations may be recommended (or in some cases restricted, depending on the laws of the jurisdiction).

Intellectual property 922 includes patents, trademarks, copyrights, and trade secrets, all of which are intangible, but are issued by a government in a given country or region and are effective only in that country or region or other countries or regions that have a treaty to allow enforcement of them. Thus, while intangible, the region of enforcement of each such asset is an important state or characteristic for intellectual property that can be tracked. The value of intellectual property 922 may be impacted by certain events, such as a lawsuit to invalidate a patent, or an accidental disclosure or theft of a trade secret. Such states and characteristics can be tracked and modeled by the system.

Goodwill and brand recognition 921 are often very valuable to an organization, and include things such as customer loyalty, relationships with clients and suppliers, public perceptions of the quality of a company's products, and other forms of sentiment and relationships. Goodwill and brand recognition 921 are very ephemeral, difficult to quantify and value, and are highly influenced by events both internal and external to the organization. For example, a safety recall of a popular product of a company, particularly where accompanied by substantial news coverage, can dramatically reduce the goodwill of a company. Such events can be tracked as states of a goodwill asset or brand recognition asset 921, and the impact on the asset's value can likewise be tracked as a state.

Figure 10:
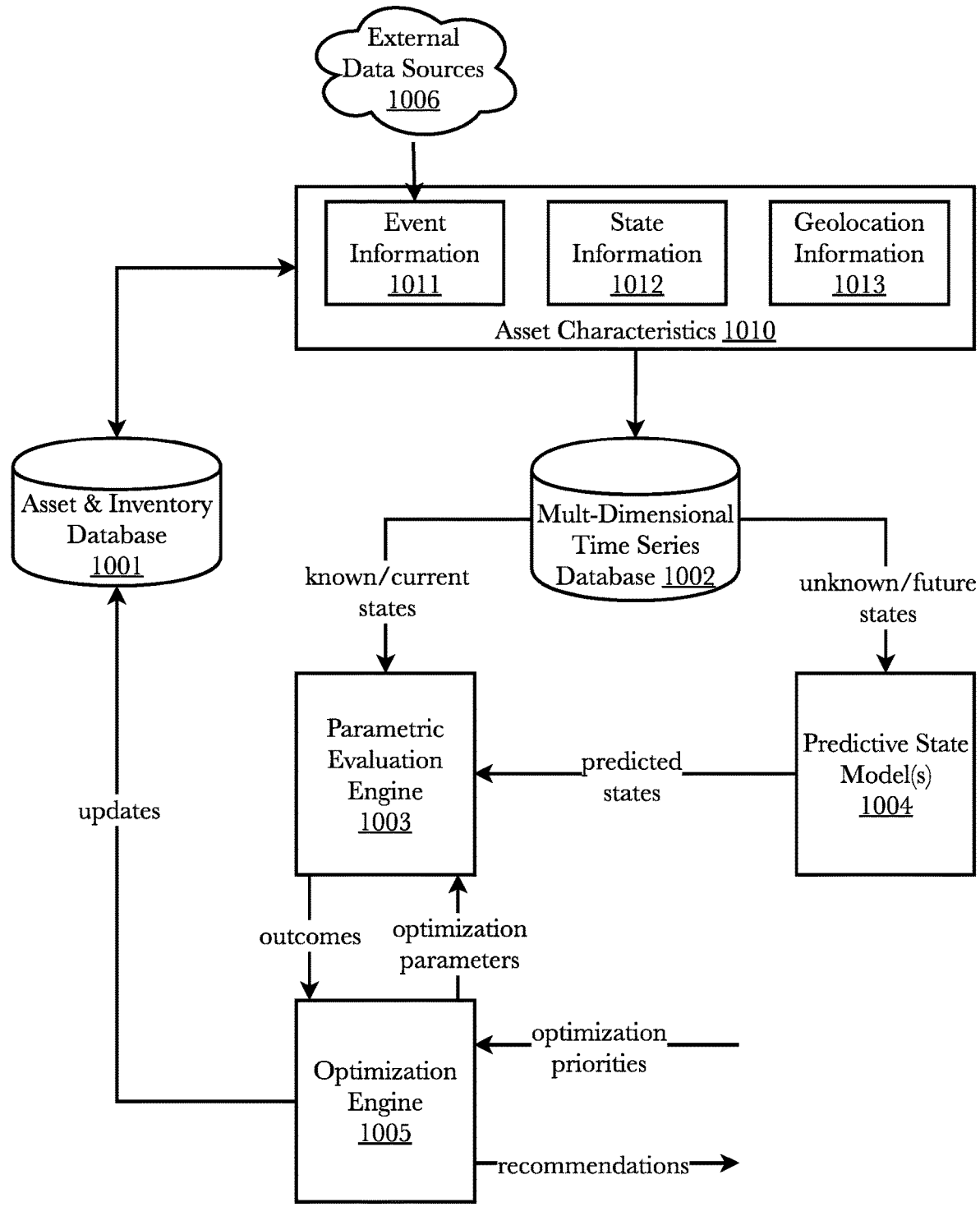
FIG. 10 is a block diagram showing an exemplary system architecture for a system for cyber-enabled infrastructure inventory and asset management with state prediction capability.

FIG. 10 is a block diagram showing an exemplary system architecture for a system for cyber-enabled infrastructure inventory and asset management with state prediction capability. In this embodiment, the system comprises an asset and inventory database 1001, a multi-dimensional time series database 1002, a parametric evaluation engine 1003, a predictive state model or machine learning algorithm module 1004, and an optimization engine 1005.

The asset and inventory database 1001 stores a complete record of all assets of an organization and their states or characteristics. This database may be stored on a single computer, but in the case of very large organizations, would likely be a distributed database such as one of several cloud-based, distributed storage systems currently available. The asset and inventory database 1001 stores asset characteristics 1010, which is any information that helps characterize, define, or describe an asset, a non-limiting subset of which comprises event information 1011, which is information about events that may influence other characteristics of the asset, geolocation information 1013, which is information about the geographical location, region of influence, or area of applicability of an asset or the location in which an asset is stored or contained (e.g., in a bank, warehouse, equipment yard, etc.), and other state information 1012, which is included here to represent any and all characteristics of the asset that may be represented as a state in a state model (including event information 1011 and geolocation information 1013). Any asset characteristic 1010 may be represented as one or more states 1012 of the asset for purposes of predictive state modeling of current and future states of the asset or any group of assets. Some of the state information, particularly event information 1011 may be obtained from one or more data sources external to the system 1006 such as databases or other information of the asset owner, or from the Internet. For example, information regarding weather-related events (perhaps delaying deliveries), news regarding pricing of commodities (perhaps news regarding cuts in oil production), etc., might influence asset characteristics 1010.

The multi-dimensional time series database 1002 stores changes to asset characteristics 1010 as time series data, such that historical trends in changes are recorded and can be used by predictive state models 1004 to make estimates regarding unknown current states and predictions of future states of any given asset or group of assets. The time series database is multi-dimensional, meaning that it can store multiple vector dimensions of a given variable at each time point, thus allowing for machine learning algorithm analysis of multiple dimensions of any given variable over time. Thus, for each characteristic of an asset, multiple dimensions (vectors) of that characteristic may be tracked and analyzed over time. As a simple example, for the characteristic of spoilage of a bottle or case of wine, temperature, exposure to sunlight, and exposure to shaking or vibration, may all be tracked over time as dimensions (vectors) associated with possible spoilage of the wine. These multi-dimensional time series data for the bottle or case of wine may then be analyzed using machine learning algorithms to determine the state of the wine (i.e., whether it is likely to be spoiled, considering patterns of spoilage of wine associated with those data dimensions).

The predictive state model 1004 is one or more machine learning algorithms applied to a state system, the state system in this case being states of an asset or group of assets and the interactions between those states. The machine learning algorithms used in the predictive state model 1004 may be of any suitable type, but in a preferred embodiment, a hidden Markov model can be used to determine unknown or future states, an unknown state being either an unobservable state (i.e., a hidden state in a hidden Markov model) or an observable state which has become unobservable for some period of time (e.g., a poor connection prevents wireless data transfer of the geographical location of an asset for a period of time). A future state is unknown by definition, but predictions can be made about future states by applying machine learning algorithms to multi-dimensional time series state data. The predictive state model 1004 sends its predicted state information to the parametric evaluation engine 1003 for analysis.

The parametric evaluation engine 1003 uses known or predicted states of an asset or group of assets to evaluate the outcomes of changes to states by iterating the states of those assets and their interactions (i.e., a state system) over one or more parameters. The iteration of the state system over a range of values for a given parameter identifies the sensitivity of the state system to changes in that parameter. Parametric evaluation over one or more optimization parameters provided as inputs (e.g., through an optimization engine) produces outputs of sensitivity to parameters that can be used by an optimization engine to optimize the state system for a given priority (e.g., maximization of value over a certain time frame).

Finally, an optimization engine 1005 is used to optimize the state system for a given optimization priority or priorities, and make recommendations about management of assets based on that priority or priorities.

The following is a simplified example of operation for purposes of illustration. Assume that the optimization engine 1005 receives an optimization priority for maximization of asset value within a period of 6 months from now, and that the group of assets under consideration are 10,000 cases of wine stored in five different warehouses in five different states, plus the goodwill of a new winery that has produced its first batch of wine. Assume further that each case of wine is cyber-enabled, and separately provides data several times a day regarding the location of the case of wine, the temperature of the environment in which the case of wine is stored, and the amount of sunlight (via a UV sensor) to which case is exposed. The condition of the wine in each case is an unknown (i.e., a hidden Markov state), but the location, temperature, and amount of sunlight are observable. The condition of the wine affects not only the value of that case of wine, but also the goodwill of the winery producing the wine. Sales of a large batch of poor condition wine will substantially reduce the goodwill of the winery. The data from the cyber-enabled cases of wine is stored as time series data in the multi-dimensional time series database, along with event information such as wine sales prices and trends and trends in valuation of small wineries. This information is fed to the predictive state model 1004 to determine a condition of each case of wine given its time series data using a hidden Markov model. The predictive state model 1004 determines that half of the wine is in poor condition due to storage in high temperatures and exposure to sunlight (e.g. perhaps through occasional transfer of the cases outdoors during warehouse reorganizations). This predicted state information is sent to the parametric evaluation engine 1003, which iterates the state system over the parameter of sales of poor quality wine to determine a sensitivity of the goodwill to sales of poor quality wine. The outcome is sent to the optimization engine 1005, which determines how many bottles of the poor quality wine can be sold before the reduction in goodwill of the winery exceeds the revenue from sales of the poor quality wine. State information for each case of wine (including any sales that occur) are updated in the asset and inventory database 1001.

Figure 11:
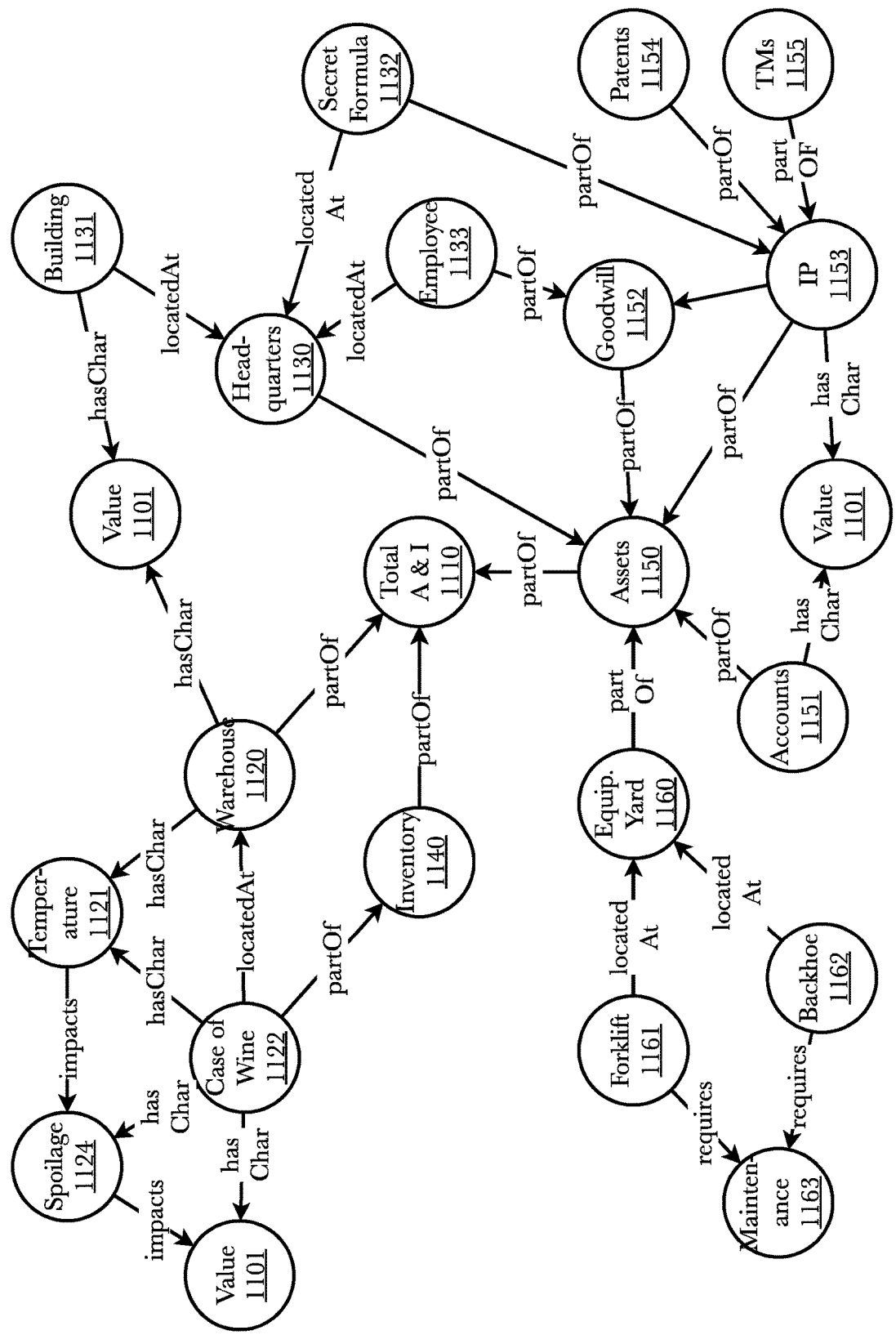
FIG. 11 is a directed graph diagram showing an exemplary cyber-physical graph for representation of assets, their characteristics and states, and their relationship to other assets.

FIG. 11 is a directed graph diagram showing an exemplary cyber-physical graph for representation of assets, their characteristics and states, and their relationship to other assets. In this simplified example, the total assets and inventory of an organization 1110 comprise a warehouse 1120, in which is stored an inventory 1140, and non-inventory assets 1150. The inventory 1140 comprises a case of wine 1122, which has the characteristics of temperature 1121, spoilage 1124, and value 1101. The warehouse also has the characteristics of temperature 1121 and value 1101. The non-inventory assets 1150 comprise a headquarters 1130 that has a building 1131 and at which is located a secret formula and an employee 1133, goodwill 1152, intellectual property, and monetary accounts 1151. The building 1131 has a value 1101. The secret formula is part of the intellectual property 1132, as are patents 1154 and trademarks 1155, and along with the employee's 1133 talents comprise the goodwill 1152 of the company. The intellectual property 1153 and accounts all have a value 1101 associated with them. The equipment yard 1160 contains a forklift 1161 and a backhoe 1162, each of which require maintenance 1163 at regular intervals.

The assets, characteristics, and states are represented by vertices within the cyber-physical graph, and the relationships between the vertices are represented by edges between the vertices. In this example, the edges are directed, but not weighted, but in other embodiments, weighting of the edges will add to the predictive ability of the cyber-physical graph. The cyber-physical graph can be analyzed by the optimization engine 1005 using a variety of graph traversal algorithms to determine optimal paths within the graph, which may be used to determine the impacts on one portion of the graph due to changes in other portions of the graph, to calculate the probabilities of certain impacts of such changes, or to optimize the value or other characteristics of the system as a whole. The vertices of the graph can be updated with known information and predictions of unknown or future states by the predictive state model 1004, all changes to which are stored as time series data in the multi-dimensional time series database 1002.

Figure 12:
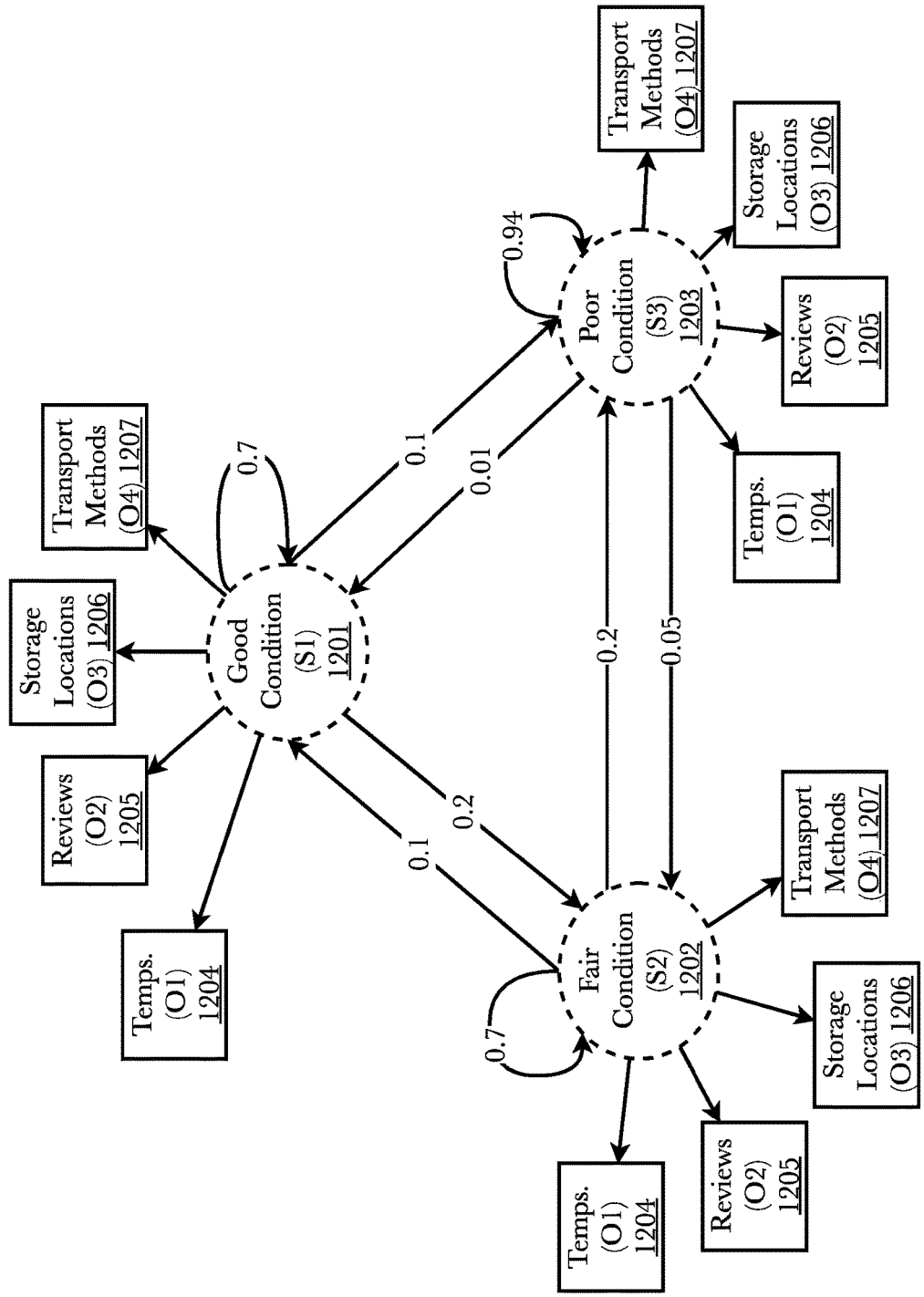
FIG. 12 is an exemplary hidden Markov model diagram for representing and predicting an unknown state of an asset in inventory.

FIG. 12 is an exemplary hidden Markov model diagram for representing and predicting an unknown state of an asset in inventory. In this example, the asset is a case of wine in inventory and the condition of the wine is a hidden state (as it is difficult to know the state of the wine in a given bottle without opening that bottle). The diagram has three hidden condition states, good condition 1201, fair condition 1202, and poor condition 1203. The probability of transitions from one state to another are shown by the probability numbers (ranging from 0 to 1) on each arrow between states. In this example, it is more likely that the condition of the wine will degrade between states than it will improve. It is much more likely that a bottle of wine subjected to high temperatures will degrade from good to fair or from fair to poor than the reverse, although certain wines do improve with age over a period of 3 to 15 years, so it is possible that higher temperatures will accelerate aging and thus improve the condition of the wine for a period of time.

While the condition states of the wine are hidden, there are four observable states (also known as outputs or emissions), storage temperature 1204, online reviews 1205, storage locations 1206, and transport methods 1207. On the diagram, each of these observable states is shown with a corresponding hidden state value for clarity only; note that in this instance there are only four total observable states. Also for clarity, the probabilities relating each hidden state value to its related observable state values have been omitted. Consistent with the hidden Markov model, it is unknown from which of the hidden condition states each observable state occurs, but according to Bayes' Theorem, the probability that a bottle (or case) of wine is in a particular state on a given day can be calculated by combining the probabilities of transition between hidden condition states with the observations over time. For a single observation (e.g., temperature which is observable state O1 in the diagram), the formula for calculating the hidden condition state on a given day is:

$$P(S_i \mid O_i 1) = \frac{P(O_i 1 \mid S_i) P(S_i)}{P(O_i 1)}$$

or for a sequence of t days:

$$P(S_i, \ldots, S_t \mid O_i 1, \ldots, O_t 1) = \frac{P(O_i 1, \ldots, O_t 1 \mid S_i, \ldots, S_t) P(S1, \ldots, S3)}{P(S1, \ldots, S3)}$$

where $P(S_i \mid O_i)$ is the probability of being in a given state, $O1 = \{O_1 1, \ldots, O_t 1\}$, where $Oi \in \{\text{high temp, low temp}\}$, and $S = \{S1, \ldots, S3\}$, where $Si \in \{\text{good, fair, poor}\}$.

This equation can be expanded to account for multiple observations, and matrix operations can be applied to solve for the variables in the equation.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 13:
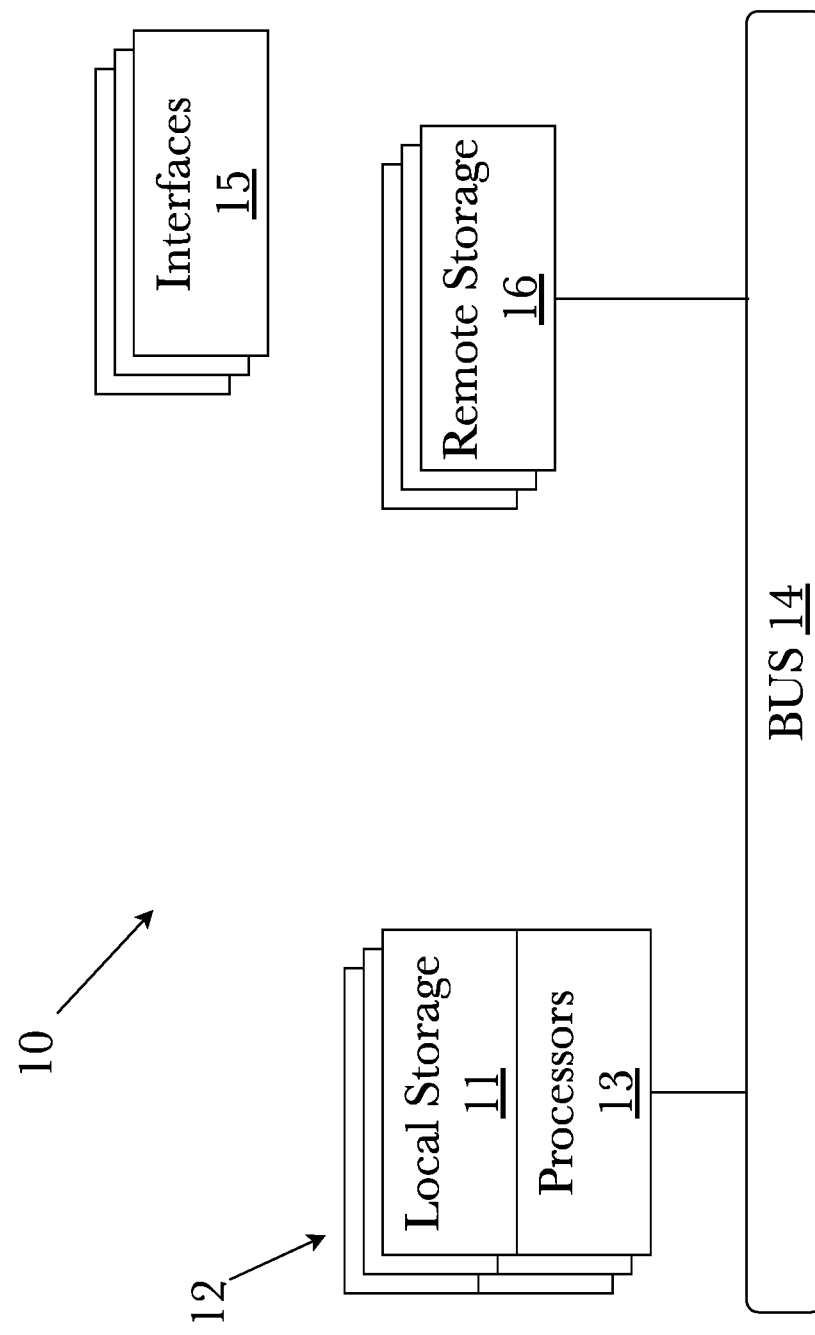
FIG. 13 is a block diagram illustrating an exemplary hardware architecture of a computing device.

Referring now to FIG. 13, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 13 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
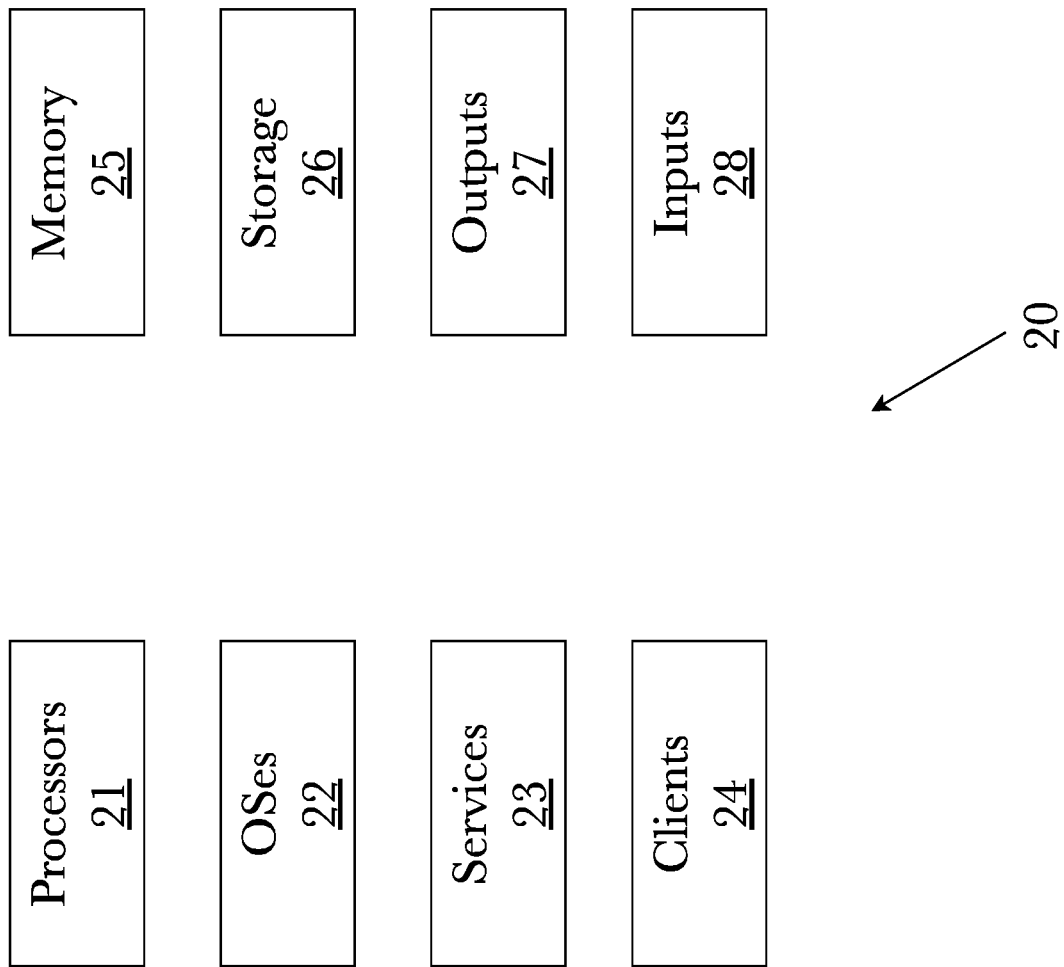
FIG. 14 is a block diagram illustrating an exemplary logical architecture for a client device.

In some aspects, systems may be implemented on a standalone computing system. Referring now to FIG. 14, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13). Examples of storage devices 26 include flash memory, magnetic hard drive, CD-ROM, and/or the like.

Figure 15:
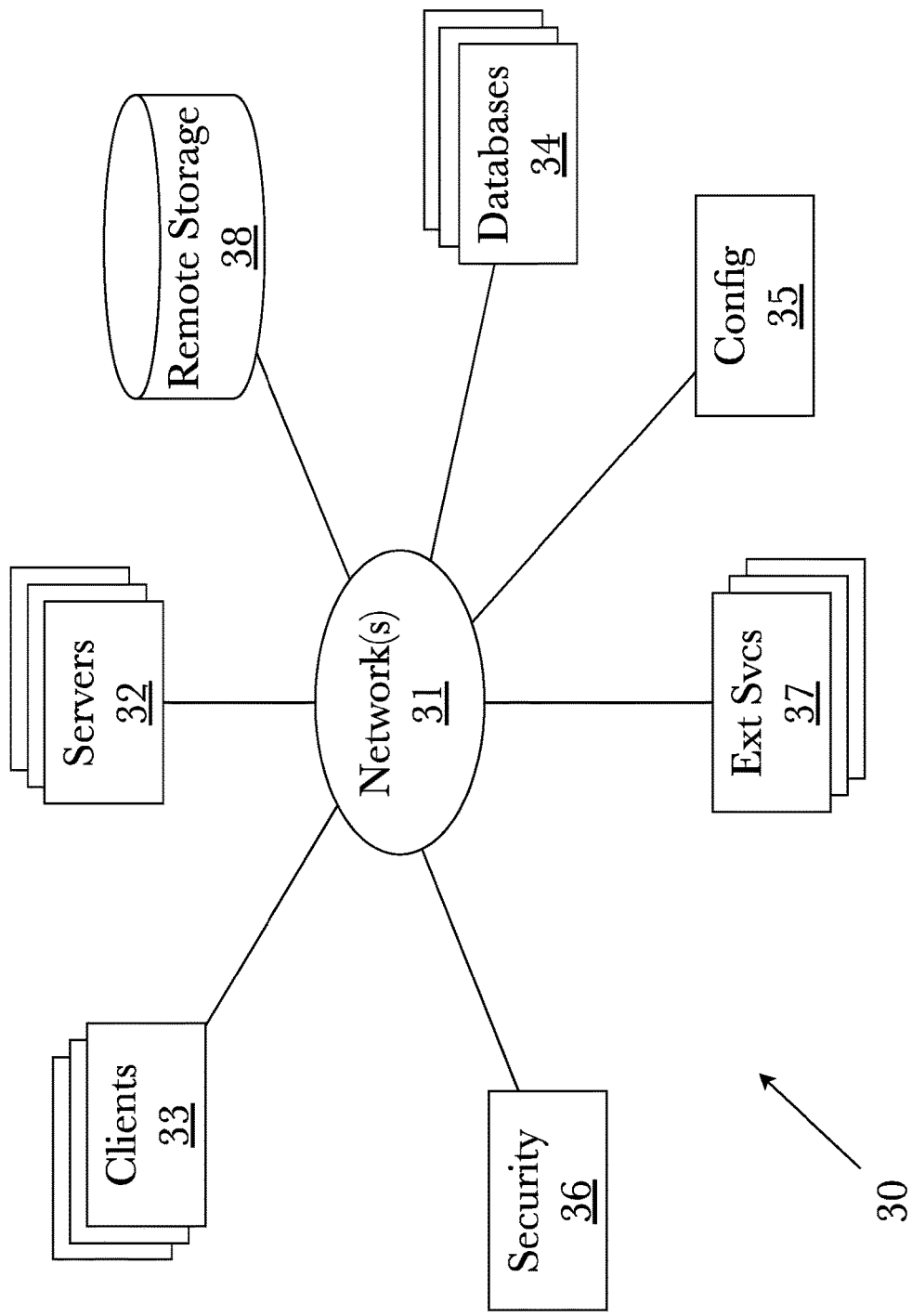
FIG. 15 is a block diagram showing an exemplary architectural arrangement of clients, servers, and external services.

In some aspects, systems may be implemented on a distributed computing network, such as one having any number of clients and/or servers. Referring now to FIG. 15, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 14. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 16:
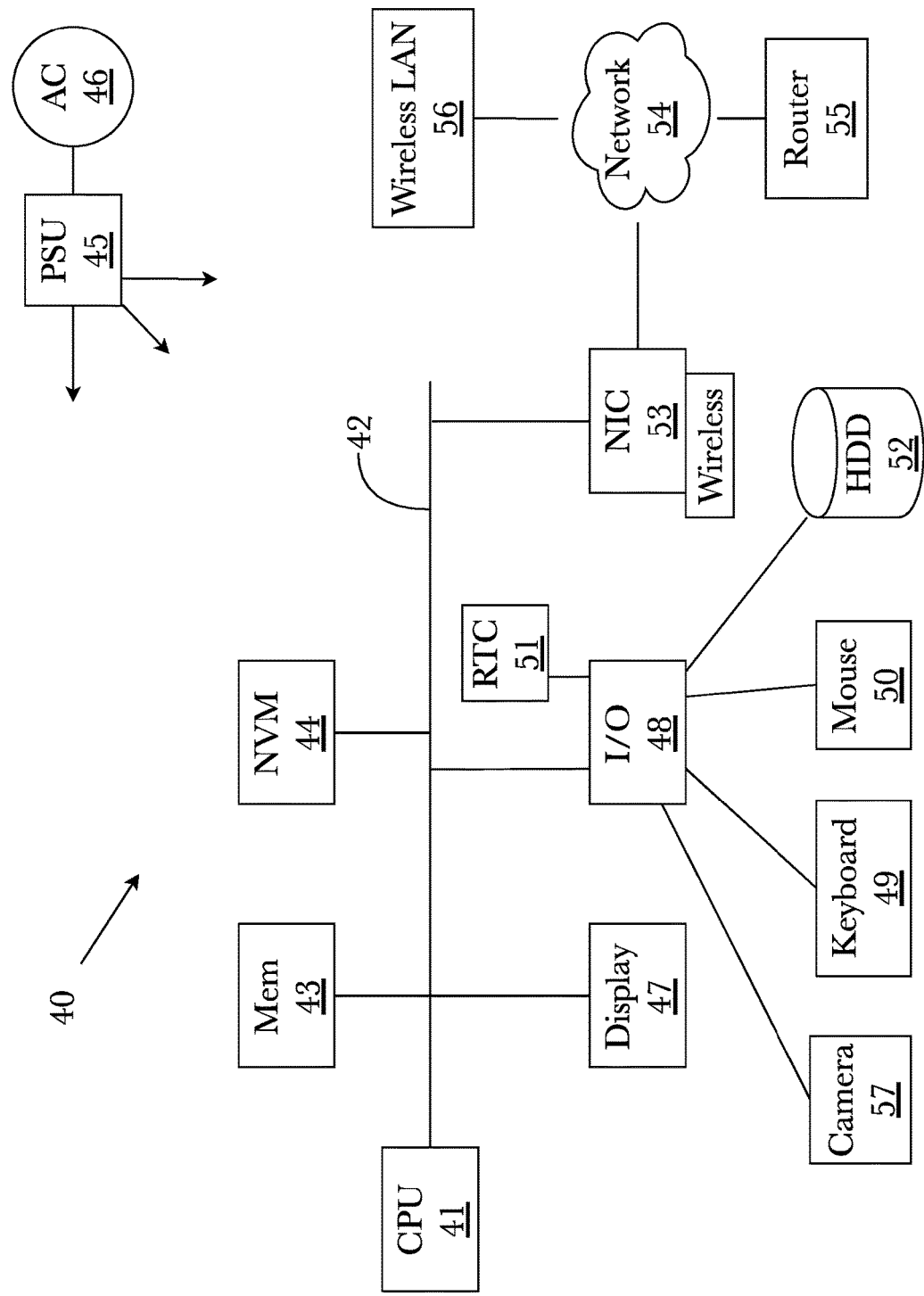
FIG. 16 is another block diagram illustrating an exemplary hardware architecture of a computing device.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for inventory and asset management with state prediction capability, comprising:
a first computing device comprising a first processor and a first memory, and a non-volatile data storage device;
a multi-dimensional time series database stored on the non-volatile data storage device;
a multi-dimensional time series module comprising a first plurality of programming instructions stored in the first memory and operating on the first processor which cause the first computing device to:
receive state information for a plurality of assets over time; and
store the state information as time series data in the multi-dimensional time series database;
a predictive state model comprising a second plurality of programming instructions stored in the first memory and operating on the first processor which cause the first computing device to:
retrieve the time series data;
construct a state model for some or all of the plurality of assets from the time series data;
predict an unknown or future state for one of the plurality of assets by applying a machine learning algorithm to the time series data for the one or the plurality of assets, the unknown or future state comprising an asset location, an asset condition, an asset value, or any combination thereof; and
send the state model and the prediction to a parametric analyzer;
a parametric analyzer comprising a third plurality of programming instructions stored in the first memory and operating on the first processor which cause the first computing device to:
receive the state model and the prediction;
receive a parameter for analysis;
iterate the state model over a range of values of the parameter to determine a sensitivity of the state model to changes in value of the parameter; and
send the state model and the determined sensitivity of the state model to an optimization engine; and
an optimization engine comprising a fourth plurality of programming instructions stored in the first memory and operating on the first processor which cause the first computing device to:
receive an optimization priority comprising the parameter for analysis, wherein the optimization priority maximizes a value over time;
send the parameter for analysis to the parametric analyzer;
receive the state model and the determined sensitivity of the state model; and
calculate an optimal state for the state model using the determined sensitivity of the state model, the optimal state being a state of the state model that most closely corresponds to the optimization priority.

2. The system of claim 1, further comprising a cyber-physical graph module comprising a fifth plurality of programming instructions stored in the first memory and operating on the first processor which cause the first computing device to:
retrieve the state model;
construct a cyber-physical graph of the state model, the cyber-physical graph comprising vertices representing assets, asset characteristics, and asset states, and edges representing relationships between the vertices; and
wherein the optimization engine calculates the optimal state using the determined sensitivity of the state model by running one or more graph traversal algorithms to determine an optimal path within the cyber-physical graph.

3. The system of claim 1, further comprising a plurality of second computing devices each attached to one of a plurality of physical assets, each second computing device comprising a second processor, a second memory, a device identifier, a sensor, a wireless communication device, and a second plurality of programming instructions stored in the second memory and operating on the second processor, wherein the second plurality of programmable instructions, when operating on the second processor, cause the second computing device to:
periodically determine a state of the physical asset to which it is attached, the state comprising data from the sensor;
periodically generate a status update message, the status update message comprising the device identifier of the second computing device and the determined state; and
send the status update message via the wireless communication device to the first computing device;
wherein the device identifier and determined state for each status update message are saved as time series state information in the multi-dimensional time series database.

4. The system of claim 3, wherein the sensor is a geolocation sensor.

5. The system of claim 3, wherein the sensor is a temperature sensor.

6. The system of claim 1, wherein the state information for one or more assets further comprises a condition for execution of a smart contract.

7. The system of claim 6, further comprising a smart contract execution module comprising a sixth plurality of programming instructions stored in the first memory and operating on the first processor which cause the first computing device to:
generate a smart contract for one of the plurality of assets;
receive a parameter for execution of the smart contract, the parameter specifying a condition for execution of the contract;
monitor the state information for the one of the plurality of assets for the parameter; and
execute the smart contract when the parameter is detected in the state information.

8. A method for inventory and asset management with state prediction capability, comprising the steps of:
using a multi-dimensional time series module operating on a first computing device comprising a first processor and a first memory, and a non-volatile data storage device to:
receive state information for a plurality of assets over time;
store the state information as time series data in a multi-dimensional time series database on the non-volatile data storage device;
using a predictive state model operating on the first computing device to:
retrieve the time series data;

construct a state model for some or all of the plurality of assets from the time series data;

predict an unknown or future state for one of the plurality of assets by applying a machine learning algorithm to the time series data for the one or the plurality of assets, the unknown or future state comprising an asset location, an asset condition, an asset value, or any combination thereof;

using a parametric analyzer operating on the first computing device to:

receive the state model and the prediction;

receive a parameter for analysis from an optimization engine operating on the first computing device;

iterate the state model over a range of values of the parameter to determine a sensitivity of the state model to changes in value of the parameter; and send the state model and the determined sensitivity of the state model to the optimization engine; and using the optimization engine operating on the first computing device to:

receive an optimization priority comprising the parameter for analysis, wherein the optimization priority maximizes a value over time;

calculate an optimal state for the state model using the determined sensitivity of the state model, the optimal state being a state of the state model that most closely corresponds to the optimization priority.

9. The method of claim 8, further comprising the steps of:

constructing a cyber-physical graph of the state model, the cyber-physical graph comprising vertices representing assets, asset characteristics, and asset states, and edges representing relationships between the vertices;

wherein the optimization engine calculates the optimal state using the determined sensitivity of the state model by running one or more graph traversal algorithms to determine an optimal path within the cyber-physical graph.

10. The method of claim 8, further comprising the step of:

attaching a plurality of second computing devices to one of a plurality of physical assets, each second computing device comprising a second processor, a second memory, a device identifier, a sensor, a wireless communication device, and a second plurality of programming instructions stored in the second memory and operating on the second processor, wherein the second plurality of programmable instructions, when operating on the second processor, cause the second computing device to:

periodically determine a state of the physical asset to which it is attached, the state comprising data from the sensor;

periodically generate a status update message, the status update message comprising the device identifier of the second computing device and the determined state; and send the status update message via the wireless communication device to a first computing device;

wherein the device identifier and determined state for each status update message are saved as time series state information in the multi-dimensional time series database.

11. The method of claim 10, wherein the sensor is a geolocation sensor.

12. The method of claim 10, wherein the sensor is a temperature sensor.

13. The method of claim 8, wherein the state information for one or more assets further comprises a condition for execution of a smart contract.

14. The method of claim 13, further comprising the step of using a smart contract execution module on a computing device to:

generate a smart contract for one of the plurality of assets;

receive a parameter for execution of the smart contract, the parameter specifying a condition for execution of the contract;

monitor the state information for the one of the plurality of assets for the parameter; and execute the smart contract when the parameter is detected in the state information.

* * * * *